United States Patent [19]
Komuro et al.

[11] Patent Number: 6,034,847
[45] Date of Patent: Mar. 7, 2000

[54] APPARATUS AND THIN FILM MAGNETIC HEAD WITH MAGNETIC MEMBRANE LAYERS OF DIFFERENT RESISTIVITY

[75] Inventors: Matahiro Komuro; Tomohiro Okada; Masaaki Sano; Moriaki Fuyama; Hiroshi Fukui; Katsumi Hoshino; Takashi Kawabe, all of Hitachi; Yohji Maruyama, Iruma; Atsushi Nakamura, Hachioji; Miki Hara, Kokubunji; Noboru Shimizu, Tokorozawa; Noboru Yoshida, Hitachi, all of Japan

[73] Assignee: Hitachi, Ltd., Tokyo, Japan

[21] Appl. No.: 08/992,089

[22] Filed: Dec. 17, 1997

[30] Foreign Application Priority Data

Dec. 25, 1996 [JP] Japan .................................. 8-344941
Dec. 25, 1996 [JP] Japan .................................. 8-344995

[51] Int. Cl.[7] .................................................. G11B 5/147
[52] U.S. Cl. .......................................... 360/126; 360/113
[58] Field of Search .................................. 360/119, 122, 360/126, 113

[56] References Cited

U.S. PATENT DOCUMENTS

| | | | |
|---|---|---|---|
| 4,799,118 | 1/1989 | Yamada et al. | 360/125 |
| 5,126,907 | 6/1992 | Hamakawa et al. | 360/126 |
| 5,239,435 | 8/1993 | Jeffers et al. | 360/126 |
| 5,301,079 | 4/1994 | Cain et al. | 360/113 |
| 5,315,468 | 5/1994 | Lin et al. | 360/113 |
| 5,343,422 | 8/1994 | Kung et al. | 365/173 |
| 5,435,053 | 7/1995 | Krounbi et al. | 29/603.25 |
| 5,438,747 | 8/1995 | Krounbi et al. | 360/113 |
| 5,465,185 | 11/1995 | Heim et al. | 360/113 |
| 5,590,008 | 12/1996 | Tanabe et al. | 360/126 |
| 5,652,687 | 7/1997 | Chen et al. | 360/126 |
| 5,805,391 | 9/1998 | Chang et al. | 360/113 |
| 5,828,533 | 10/1998 | Ohashi et al. | 360/126 |

FOREIGN PATENT DOCUMENTS

| | | |
|---|---|---|
| 0 222 183 A2 | 5/1987 | European Pat. Off. . |
| 0 678 855 A1 | 10/1995 | European Pat. Off. . |
| 5-120630 | 5/1993 | Japan . |
| WO 92/16935 | 10/1992 | WIPO . |

Primary Examiner—Brian E. Miller
Attorney, Agent, or Firm—Antonelli, Terry, Stout & Kraus, LLP

[57] ABSTRACT

In order to prevent degradation of the recording performance during radio frequency recording, and to provide a thin film magnetic head and a recording reproducing sectional pattern magnetic head which has a magnetic pole width less than 2 $\mu$m and an ultra high density magnetic storage apparatus of 10 Gb/ in$^2$ grade, a recording head is provided in which a lower part magnetic film serves as a shielding film of a reproducing selection, a non magnetic gap film is formed during formation of the upper part magnetic film and the lower part magnetic film, one part of the lower part magnetic film or the upper part magnetic film has a higher resistivity of more than 80 $\mu\Omega$cm than other parts, the upper part magnetic film is formed by flame galvanizing, and a gap section of the lower part magnetic film or the upper part magnetic film has a convex shape.

10 Claims, 13 Drawing Sheets

| Ta (5nm) |
| --- |
| Cr45 Mn45 Pt10 (30°nm) |
| Ni81Fe19 (3nm) |
| Cu (2.5nm) |
| Ni81Fe19 (5nm) |
| Ta (5nm) |
| grass |

APPARATUS AND THIN FILM MAGNETIC HEAD WITH MAGNETIC MEMBRANE LAYERS OF DIFFERENT RESISTIVITY

BACKGROUND OF THE INVENTION

Present invention relates to a magnetic recording apparatus using a computer and an information processor, and it especially relates to a new thin film magnetic head and to a recording reproducing separate type magnetic head and magnetic storage playback equipment.

For purposes of storing (recording) information in an information processing apparatus, a semiconductor storage device and a magnetic storage device are mainly used. From the viewpoint of access time, the semiconductor storage device is used as an internal storage apparatus, and from the viewpoint of large storage capacity and non-volatility, the magnetic storage device is used as an external recording apparatus.

At the present time, the dominant magnetic memories are a magnetic disk and a magnetic tape. As the recording media used in these memories, a magnetic thin film is formed on an aluminum substrate or on a resin tape. In order to write information into the recording media, a function unit having an electromagnetic converting function is used. Further, a function unit utilizing a magneto-resistance phenomenon or a giant magneto-resistance phenomenon or an electromagnetic induction phenomenon is used in order to regenerate the magnetic information. These function units are installed in an output-input device known as a magnetic head.

The magnetic head and the medium are relatively moved and information is magnetically written in arbitrary positions on the medium, so as to make it possible to electrically regenerate the information magnetically as necessary. Taking a magnetic disk apparatus as an example, the magnetic head is composed of a writing-in portion for writing in magnetic information and a regenerating portion. The writing-in portion is composed of a coil and magnetic poles magnetically coupled and enveloping the coil on either side thereof. The regenerating portion has a magneto-resistance effect element portion and electrodes for conducting a constant current to the magneto-resistance effect element portion for detecting a resistance change. Between the writing-in portion and the regenerating portion, there is provided a magnetic shield layer. Further, these function units are formed on a magnetic head main body through a base layer.

The electromagnetic conversion function is utilized in the recording operation and the magnetoresistance effect is utilized in the reproducing operation, and a reproducing of the information is performed by detecting the electromagnetic induction current induced in a coil provided in a write section. In this case, recording and reproducing may be performed in one function part.

The performance of a storage apparatus is determined by the speed of the information input and output operations and the storage capacity, and in order to improve the competitiveness of the product, it is necessary to shorten the access time and to increase the storage capacity. In addition to this, a reduction in the size of the storage apparatus has become important from the point of view of reducing the weight and size of an information processing apparatus in recent years. In order to satisfy this requirement, it is necessary to develop a magnetic storage apparatus which can write and regenerate a large amount of information using a single recording medium. For this purpose, it is necessary to increase the recording density of the apparatus. In order to realize high density recording, it is necessary to make the size of the magnetic domain small. This can be achieved by making the width of the writing-in magnetic pole narrow and increasing the frequency of the writing-in current conducted in the coil.

In the reproducing head, the resolution should be high in order to realize a high recording density, and the gap length and track width need to be narrow in order to reduce the flux leakage at the pole tip to a minimum in the recording head. When the gap length and the track width become narrow, the flux acidity between the pole tips decreases. In a composite head provided with a MR or GMR membrane in a reproducing section, the reproducing section and recording section are combined in the recording apparatus. A lower magnetic film of the recording section is utilized as a shield membrane of the reproducing section too. Thereby, the manufacturing process is simplified and it can be aligned on the same support system.

Side fringe and the radio frequency characteristic also become a problem with a narrow track recording head, the minimum track width being determined by the side fringe magnetic field of the former. The problem of the side fringe magnetic field may be prevented to some extent by notching the lower magnetic film and forming a pedestal pole tip. Japanese Patent Laid-open No. 7-262519 indicates that a pedestal is provided on the pole tip in order to reduce the side fringe. Moreover, high saturation magnetic moment material is provided on the pedestal pole tip layer, and a second shield layer is provided of a material of low saturation moment, such as Permalloy. That is, the lower magnetic film is constructed with two layers of high saturation/low saturation magnetic moment. However, there is no mention of the resistivity of the magnetic film at all. Accordingly, when a radio frequency recording is considered, the abovemention arrangement may not be satisfactory, and the resistivity and the saturation flux density become an important matter.

Moreover, according to the above-mentioned prior art, as the magnetic pole width becomes as narrow as 2.5 $\mu$m, and the frequency is raised to about 90 MHz, a storage density of 2 $Gb/in^2$ may be provided. However, when an even higher density is needed, the following problem occurs, and it becomes clear that a higher density can not be attained. This problem relates to provision of a manufacturing technology which is also to narrow the magnetic pole width and a further problem of a magnetic nature which occurs when making the magnetic pole width narrow.

At first, the problem of providing a manufacturing technology which makes it possible to narrow the magnetic pole width will be described. A magnetic pole constituting a magnetic gap is needed to generate (leak) a magnetic field in order to invert the magnetization of the recording media for storing information. This magnetic field is determined by a parameter referred to as the magnetic coercive force of the recording media, and it is necessary to strengthen the magnetic coercive force in the currently used media for high density recording. Accordingly, the volume of the magnetic pole part should not be reduced, if one is to provide a strong magnetic field. That is, the thickness of the magnetic pole should not be constructed to be thin, even if the magnetic pole width is narrowed.

The material which is generally used to form a magnetic pole is a Ni—Fe alloy. However, for this material, dry etching is difficult. On this account, a magnetic pole made of a thick film may not be formed. Thus, it is unsuited for use in the formation of a magnetic pole, and so a galvanizing method is used. In the galvanizing method, a resist pattern is provided as a mask beforehand, and Ni—Fe is grown up selectively only on the magnetic pole part where the electric pole for galvanizing is exposed. Accordingly, in order to form a minute magnetic pole pattern of less than 2 μm, a resist pattern needs to be formed having a width of less than 2 μm beforehand.

By the way, the thickness of the mask pattern needs to be higher than the galvanizing height in order to maintain the masking function in the galvanizing operation. The galvanizing masking pattern receiving constraint of height and width is formed with an approach exposure method. However, the resolution limit of this method is about 2 μm (when the thickness is about 5 μm), and so a pattern with less than this resolution limit may not be formed (an expensive manufacturing method using X-ray lithography is not considered here). On this account, there is the problem that one cannot produce a magnetic head for high density recording using the conventional method.

In the configuration of the above-mentioned magnetic head, furthermore, it is widely known that the magnetic path resistance in the neighborhood of the gap increases when the magnetic pole width is narrowed. Therefore, as the magnetic pole width is narrowed, a magnetic flux flows in the lower magnetic film from the upper magnetic film, and so the magnetic field strength which is necessary does not occur from the gap, with the result that a problem occurs. Moreover, if the writing frequency is raised in order to realize a high density recording, a problem arises in that the writing efficiency falls. That is, an eddy current is easily generated in the area of the magnetic pole, the magnetic path resistance increases by this affect, and the writing efficiency falls.

As to why the eddy current is generated, first of all secondly, the magnetic gap applies only to the metal membrane, and, secondly, the magnetic path may not be formed with a high resistance membrane or an amorphous membrane, which induce a small eddy current. It is a common weak point of the conventional magnetic head which forms the magnetic pole using a galvanizing method that the magnetic path cannot be formed with a high resistance membrane or an amorphous membrane, which generate a small eddy current.

SUMMARY OF THE INVENTION

In order to prevent deterioration of the recording performance in radio frequency recording, an object of the present invention is to provide a thin film magnetic head, a recording reproducing separate type magnetic head, and a magnetic storage head formed of a magnetic film of high resistivity partially to the pole end of a magnetic storage head.

In a thin film magnetic head of the present invention, having an upper magnetic film and a lower magnetic film arranged with a non-magnetic gap membrane therebetween, at least an end part of said upper magnetic film or said lower magnetic film being constructed of two or more layers of magnetic films. The resistivity of one of said two or more layers is higher than that of the other of said two or more layers, at least an end part of said upper magnetic film or said lower magnetic film is constructed with two or more layers of magnetic membrane, and the resistivity of the one of said two or more layers of magnetic membrane, which is spaced from said non-magnetic gap membrane, is higher than the resistivity of the other of said two or more layers of magnetic membrane, which is connected to said non-magnetic gap membrane. The end parts of said upper magnetic film and said lower magnetic film have a convex shape, and at least one part of said upper magnetic film or said lower magnetic film has a resistivity of more than 50 μΩcm.

In a recording reproducing separate type magnetic head according to the present invention, having a recording head for writing in information, a reproducing head for reading out information, and a magnetic shield provided therebetween, the recording head has an upper magnetic film and a lower magnetic film with a non-magnetic gap membrane disposed therebetween, at least an end part of said upper magnetic film or said lower magnetic film being constructed of two or more layers of magnetic membrane, and the resistivity of one of said two or more layers being higher than that of other of said two or more layers. The resistivity of one of said two or more layers of magnetic membrane, which is spaced from said non-magnetic gap membrane, is higher than the resistivity of the other of said two or more layers of magnetic membrane, which contacts said non-magnetic gap membrane, and at least one part of said upper magnetic film or said lower magnetic film has a resistivity more than 50 μΩcm. The reproducing head has a ferromagnetic body, and an antiferromagnetic body having a uni-directional anisotropism is connected to said ferromagnetic body, at least one part of said antiferromagnetic body being made of a Cr—Mn alloy, and at least one part in contact with said antiferromagnetic substance of said ferromagnetic body is made of Co or a Co alloy.

In a magnetic storage apparatus according to the present invention, in which a thin film magnetic disk turns with a speed of more than 4000 rpm during recording/reproducing operations and the recording frequency is 45 MHz or more, the magnetic storage apparatus includes a rotation means for rotating said thin film magnetic disk, a recording reproducing separate type magnetic head having a recording head provided on a floating type slider for writing in information and a reproducing head for reading out information, and a transfer means for supporting and transferring said floating type slider for said thin film magnetic disk. The recording head has an upper magnetic film and a lower magnetic film arranged on opposite sides of a non-magnetic gap membrane, at least an end part of said upper magnetic film or said lower magnetic film being constructed of two or more layers of magnetic (membrane), the resistivity of one of said two or more layers being higher than that of the other of said two or more layers and the ,resistivity of one of said two or more layers of magnetic membrane, which is spaced from said non-magnetic gap membrane, is higher than the resistivity of the other of said two or more layers of magnetic membrane, which contacts said non-magnetic gap membrane. The end parts of said upper magnetic film and said lower magnetic film have a convex shape, or at least one part of said upper magnetic film or said lower magnetic film has a resistivity of more than 50 μΩcm. The reproducing head has a ferromagnetic body, and an antiferromagnetic body having a uni-directional anisotropism is connected to said ferromagnetic body, at least one part of said antiferromagnetic body being made of a Cr—Mn alloy, and at least one part in contact with said antiferromagnetic substance of said ferromagnetic body is made of Co or a Co alloy.

(Recording Head)

In the recording head according to the present invention, it is desirable for the lower magnetic film to serve as a shield membrane with the reproducing head such as a MR or GMR. A gap membrane of non-magnetic material is formed between the upper magnetic film and the lower magnetic film, and one part of the lower magnetic film or the upper magnetic film is made with a dry process, such as a sputtering method, or by vacuum evaporation coating, preferably having a resistivity of more than 80 $\mu\Omega$cm. A frame serving as a galvanizing membrane is formed of $SiO_2$, the width of which determines the track width for recording, the track width being less than 1.5 $\mu$m.

It is desirable when the magnetic film has high resistivity of more than 80 $\mu\Omega$cm, which is more than the saturation flux density 1.5 T, the magnetic film end above and below the gap membrane is processed by RIE, and the width of the magnetic film above and below the gap membrane is determined.

Furthermore, it is desirable when the magnitude of the magnetostriction constant of the magnetic film, having a high resistivity of more than 80 $\mu\Omega$cm, is $1\times10^{-7}$ or less, and when a film thickness larger than a part of the 0.5 $\mu$m of the top and bottom magnetic film is formed with a high resistivity membrane. It is desirable when a part of the magnetic film of high resistivity is broader than one part of the magnetic film of the resistivity relating to the width of the magnetic films as viewed from a looming side.

With a view toward increasing the surface recording density, there arises a tendency that the recording frequency of the magnetic disc unit increases as well. When the recording frequency exceeds 100 MHz, the eddy current loss of the magnetic film becomes large and the recording characteristic deteriorates. When the track width is 2 $\mu$m, the gap length is 0.3 $\mu$m, and the saturation flux density of the magnetic film is 1.0 T, the magnetic field strength becomes higher as the resistivity of the magnetic film in a radio frequency condition of 100 MHz or more becomes higher, and it becomes suitable at 80 $\mu\Omega$cm or greater. From this calculation result, it may be understood that a membrane having a high resistivity needs to be used for one part of the magnetic pole, especially an end of the magnetic film. Furthermore, in order to reduce the noise after writing and to reduce the heat applied for treatment during recording head manufacture, it is preferable to make the magnetostriction constant of the magnetic film $1\times10^{-7}$ or less. Moreover, in order to make the magnetic film thin and to prevent saturation thereof, it is preferable when the saturation flux density of the magnetic film is 1.5 T or more.

Comparing the configuration of the floating side shown in FIGS. 3A to 3C with the head configuration mass-produced currently, it becomes clear that a higher Bs of the magnetic film 5 and the magnetic film 1 in contact with the gap membrane 4 and a higher resistivity $\rho$ of the magnetic film 5 and the magnetic film 12, which is remote from the gap membrane, contribute to the high magnetic field gradient and the radio frequency characteristic. If all of the magnetic films mentioned above are made with a high Bs, high $\rho$, low lambda, low Hk and a single layer membrane, a recording head which has a high magnetic field strength and a good radio frequency characteristic can be provided, however it is difficult to mass-produce a magnetic film having such characteristics. Therefore, by making the magnetic film near the gap neighborhood with a high Bs and making a part or all of the magnetic pole which is remote from the gap of a magnetic material having a high $\rho$, a magnetic head having a good recording characteristic may be offered using a material which can be mass-produced.

It is difficult to form, with a galvanizing method, a thick (about 3 $\mu$m) membrane having a high resistivity and a high saturation flux density to satisfy these characteristics, and a membrane which consists of a 3d transition metal having a small magnetostriction constant ($1\times10^{-7}$ or less). However, if a sputtering method is used, a magnetic film which satisfies these characteristics adds oxygen and nitrogen in a Fe series, FeCo series or FeNiCo series, and it becomes possible to control the magnetostriction constant using another alloy element. If the sputtering method is used, the eddy current generation may be made small by forming the magnetic film as a multi-layer or mixed layer film using a ferromagnetism alloying membrane of the Fe series, FeCo series or FeNiCo series and with an oxide, such as Al2O3 and $SiO_2$.

It is more difficult than the case using the galvanizing method to make these magnetic films only with a membrane made by a sputtering method and to form it with a narrow track (preferably less than 1.5 $\mu$m) furthermore, and so it is more effective to make, with a galvanizing method, the part which comes in contact with the gap membrane at least (about 3 times the gap length) of the inside of the upper part magnetic film (UP) formed on the gap membrane.

The magnetic field strength, that is one of the measures of the performance of the recording head, becomes higher when making a part nearest to the gap in the core with a higher Bs than the part remote from the gap. Especially, since the magnetism characteristic of the magnetic film nearby the floating side of the gap influences the performance effectively, it is effective as a recording head of a narrow track width (less than 1.5 $\mu$m) to have a configuration in which a part which comes into contact with the gap membrane from the floating side (the gap neighborhood) is provided with a high Bs, and a part other than the high Bs membrane is provided with a high $\rho$ (even a low Bs is good).

When seen from the floating side, the width of the magnetic film in contact with the gap membrane needs to be formed in a width corresponding to the value of the track width. When the magnetic film is formed with the galvanizing method, the spacing of the galvanizing frame determines the width of the galvanizing membrane, namely the track width, and so it becomes possible to form the galvanizing membrane to have a width of 0.3–1.5 $\mu$m.

Moreover, in the galvanizing method, Fe, Ni, Co and the binary or ternary alloying membrane are capable of being formed easily, and the membrane (CoNiFe alloying, NiFe alloying) of high Bs (1.5 T or greater) is formed. The galvanizing membrane may be applied to one part of the magnetic core which comes in contact with the gap membrane that determines the track width or may be disposed near the gap membrane. When it was constituted only from a ferromagnetism chemical element, the resistivity $\rho$ of this galvanizing membrane is 50 $\mu\Omega$cm or so, and the resistivity $\rho$ in the case of a membrane having a Bs more than 1.3 T, obtained by adding a ternary transition metal chemical element, is about 60 $\mu\Omega$cm. The resistivity $\rho$ in the case of a galvanizing membrane, having a Bs more than 0.9 T, obtained by adding a metalloid chemical element, becomes about 100 $\mu\Omega$cm.

A high Bs membrane is necessary for the magnetic films 1 and 5 in FIG. 3, as mentioned above, and if the resistivity $\rho$ of the magnetic films 12 and 5 is a high value, the resistivity $\rho$ of the magnetic films 1 and 5 does not need to be high. That is, regarding the volume of the magnetic pole material, the rate of the high $\rho$ material which occupies the volume increases relative to that of the high Bs membrane (low $\rho$) material.

As shown in FIG. 1, a membrane 11 is formed by the sputtering method on one surface of a lower part magnetic film 5, the membrane 11 having a high resistivity (80 $\mu\Omega$cm or greater), high Bs >1.5 T, and magnetostriction constant (magnitude) <$1\times10^{-7}$, and a nonmagnetic film of 0.1 to 0.2 $\mu$m is formed by a sputtering method thereon as a gap membrane 4. A galvanizing membrane representing a base 3 is formed by the sputtering method on the gap membrane.

This base 3 may be formed as a high resistivity membrane. A resist frame 2 is formed on the base 3, and the upper magnetic film 1 is made with the galvanizing method. The track width is fixed by distance between the frames 2, and it is possible to form it without composition fluctuation to 0.5 μm by a frame galvanizing method. Furthermore, with the upper magnetic film 1 serving as a mask, a dry etching method, such as a milling or RIE (reactive etching) method, is employed to reduce the side fringe by removing one part of the base 3, the gap membrane 4 and the lower magnetic film (upper part screening membrane of MR and GMR) without re-adhesion.

The film thickness of the high resistivity membrane may restrain degradation of the magnetic field strength, that is to say, the recording performance in a radio frequency range, by forming it 0.5 to 3 times or more than the film thickness of the gap membrane. For an arrangement different from FIG. 1, the membranes over and under the gap 4 (lower magnetic film 5 and upper magnetic film 1) may be formed with the galvanizing method, with a result that the recording performance may be raised by making the high resistivity membrane 11 wider and thicker than the lower magnetic film 5 or the upper magnetic film 1. For example, it becomes possible for a high resistivity membrane 12 to be formed on one part of the frame and on the upper magnetic film 1 by the sputtering method. In this case, the gap membrane 4 is provided with an electroconductive non-magnetic film (Cr alloying etc.). Moreover, the frame is made of an oxide, such as $SiO_2$, and the frame removal production process is not applied as shown in FIG. 1, whereby a manufacture method is used wherein the frame is just left on the floating side. A resist may be used for the galvanizing frame.

FIG. 4 shows a similar configuration as that in FIG. 1, wherein a thin high resistivity, high Bs membrane 12 is formed on the gap membrane 4 by the galvanizing method. The film thickness is a half to three times that of the gap membrane, and if the film is constructed within this thickness range, the effect of the high resistivity is distinctly seen in a rise in the recording performance, and the use of the galvanizing process becomes possible, too. This high resistivity galvanizing membrane 12 is a ferromagnetism alloying membrane including chemical elements, such as P, B, 0 etc.

Because it is difficult for the membrane to have a high Bs, low Hk, high ρ and low λ if it is made by a galvanizing method, by using the sputtering method, as shown in FIG. 5, it is possible to provide one part 11 of the upper screening membrane and one part 12 of the upper magnetic film as a high resistivity membrane (80 μΩcm or greater).

In FIG. 5, the magnetic film 13 and the magnetic film 14 above and below the gap membrane 4 are made with a galvanizing method. The Bs of the above magnetic films 13 and 14 is higher than the Bs of high resistivity membrane (one part 11 of the shielding membrane and one part of the upper magnetic film) made by the sputtering method. The magnetic field strength from the gap becomes high by making the Bs of the magnetic film near the gap membrane high, and the radio frequency characteristic is improved by the high ρ magnetic film (11, 12) made by the sputtering method. Moreover, as shown in FIG. 5, it is a characteristic that the widths of the magnetic film 13 and gap membrane 4 and magnetic film 14 (when seen from the floating side) are narrower than the width of the magnetic film (11 and 12) apart from the gap membrane 4, whereby the magnetic field gradient of the recording head is made large.

The recording head of the present invention is constituted to sandwich the gap between magnetic films mutually with the convex magnetic poles disposed face to face as stated above.

Relating to the magnetic pole configuration of the head of the magnetic core in which the above magnetic head is exposed to a surface coming close to the recording media, the upper magnetic pole has a convex configuration and becomes convex relative to the lower magnetic pole, the lower magnetic pole has a convex configuration and becomes convex relative to the upper magnetic pole, and the convex portions of the upper magnetic pole and the lower magnetic pole are arranged in face to face relationship. The center of the width of the convex part of the upper magnetic pole and center of the width of the convex part of the lower magnetic pole are respectively arranged to be on the same line, and it is desirable to make the height of the convex part low compared with the width of the convex part.

It is desirable to produce the recording head of the present invention using following production process.

(1) After laminating the lower magnetic pole material on the magnetic head base configuration, the insulating non-magnetic film 11 is laminated and the material of the convex part constituting one part of the upper magnetic pole is furthermore laminated.

(2) A resist pattern is formed in a domain equivalent to the convex part of the upper magnetic pole on the above laminating configuration using a lithography method.

(3) Using the member forming the convex part of the upper magnetic pole and the above resist pattern as masks, the convex part is formed in the lower magnetic pole by etching the insulating non-magnetic film and the lower magnetic pole.

(4) After having formed the member which became a convex part of the upper and the lower magnetic pole, a non-magnetic insulating membrane is laminated on the entire surface, and a film having a thickness exceeding the convex part in a domain other than the convex part is laminated.

(5) By forming a remaining member constituting the upper magnetic pole member, the upper magnetic pole is formed to provide the convex part as a valley.

(6) The non-magnetic insulating membrane is processed to be flat, and one part of the member forming the convex part is exposed on the flat surface.

(7) The remaining member constituting the upper magnetic pole member is formed.

(Reproducing Head)

The reproducing head of the present invention is constructed with a magnetoresistance effect type element, a soft magnetic membrane and a hard magnetic membrane having mutually orthogonal magnetic field directions, and the magnetic field of the magnetic film forming a free layer is able to change 0–180 degrees from the magnetic field of the magnetic film forming a fixed layer by magnetic field from recording media.

In accordance with the present invention, a magnetic recording apparatus is used, the magnetic head of said magnetic recording apparatus including a magnetoresistance effect element using a huge magnetoresistance effect as a means of providing a high recording density.

One of the objects of the present invention is that an antiferromagnetism membrane which produces a replacement coupling bias should be developed by directly laminating the magnetism membrane. As means for solving the object of the present invention, at first, a main component of the antiferromagnetism membrane is composed of chromium and manganese. Secondly, in order to improve the characteristics thereof, by adding one chemical of the platina group, aurum, silver, copper, nickel and cobalt, or plural chemical elements chosen among them so as to increase the cell constant while keeping the body-centered cubic structure of this configuration, the size of the replacement coupling magnetic field and the temperature characteristic are improved. Thirdly, in order to boost the size of one direction anisotropism occurring during the ferromagnetic body and the antiferromagnetic substance, the composition of the ferromagnetic body is provided with cobalt or a cobalt alloy comprising cobalt as a main component. Co—Fe—Ni alloy is good for the composition of the cobalt alloy when it is used as soft magnetic material; moreover, a Co—Pt alloy is good when it is used as a high coercive force material. Fourthly, in order to harmonize the direction of one direction anisotropism, it is heat-treated. Fifthly, it is especially effective for a spin valve type magnetoresistance effect membrane. The hard magnetic layer in contact with the antiferromagnetism layer is constructed with a laminating body of the hard magnetic layer of three layers or more, or the total thickness is composed to be not less than 3 nm so that heat deterioration of the characteristic of the magnetoresistance effect may be prevented.

In accordance with the present invention, since the magnetic recording reproducing device uses the magnetoresistance effect element described above in the reproducing part, a high recording density, that is, a recording wave length recorded on a high recording medium becomes short, and the width of the recording track becomes narrow with sufficient reproducing capacity and effective recording may be maintained.

That is, the magnetoresistance effect element of the present invention is realized with a fixed bias or a longitudinal bias with the antiferromagnetic substance of chromium group alloy, or the antiferromagnetic substance of a Mn group alloy and the cobalt series ferromagnetic body. Moreover, the hard magnetic layer in contact with the antiferromagnetism membrane is constituted with a laminated body of three layers or more of a hard magnetic material, for example, Co/NiFeCr/Co, and the total thickness is provided to be 3 nm or more, preferably 3 to 20 nm. Thereby, a spin valve type magnetoresistance effect element having a high resistance variation factor, a large replacement coupling magnetic field, and a high thermal stability is realized, and a magnetoresistance effect element having a good sensitivity with reliability, a magnetic head and a magnetic recording apparatus having the high recording density may be obtained.

The reproducing head of the present invention is a magnetic field sensor containing a ferromagnetic body and an antiferromagnetic substance cohering to the ferromagnetic body, and at least a part of the antiferromagnetic substance which allows one direction anisotropism to appear in the ferromagnetic body consists of a Cr—Mn alloy, and at least a part which coheres to the antiferromagnetic substance of the ferromagnetic body consists of Co or a Co alloy.

Moreover, the reproducing head of the present invention is characterized by an antiferromagnetism layer contacted with either of a magnetic layer, the first and the second magnetic layer of the ferromagnetic body partitioned off by the non-magnetic metal layer and the antiferromagnetism layer, wherein the magnetization direction of the first magnetic layer of the ferromagnetic body when the applied magnetic field is null, intersects the magnetization direction of the second layer, and the magnetization direction of the second magnetic layer is fixed or not fixed. The reproducing head of the present invention further comprises a means for letting the magnetoresistance effect element produce a current, and a means for detecting the electric resistance variation of the magnetic resistance sensor due to a rotation of the magnetization of the first layer as a function of the detected magnetic field, wherein the first and the second magnetic layer are made of Co or a Co alloy and the antiferromagnetism layer is a Cr—Mn alloy.

The magnetoresistance effect element has the constitution of a soft magnetic layer/non-magnetic layer/hard magnetism layer/antiferromagnetism layer, and a magnetoresistance effect function arises desirably as the magnetization of the soft magnetic layer turns according to an outside magnetic field and the relative angle with the magnetization of the hard magnetism layer changes.

An alloy containing 30–70 atom % Mn is desirable for said Cr—Mn alloy, and at least one selected from the group consisting of Co, Ni, Cu, Ag, Au, Pt, Pd, Rh, Ru, Ir, Os and Re furthermore may include 0.1–30 atom % in total content.

The hard magnetic layer is constructed with a laminating body having Co or a Co alloy film on both sides thereof through Co or a Co alloy, or a Ni alloy film, and the antiferromagnetism layer consists of a Cr—Mn alloy or a Cr—Mn—X alloy, wherein X is at least one element selected from the group of Co, Ni, Cu, Ag, Au, Pt, Pd, Rh, Ru, Ir, Os and Re, and the total content thereof is desirably 0.1–30 atom %.

Furthermore, in a preferred embodiment of the present invention, the magnetic storage apparatus is actuated in an atmospheric temperature of 100° C. or more, the one direction anisotropism which occurs in the laminating constitution of the hard magnetic layer and the antiferromagnetism layer is about the same as the direction of the magnetic field occurring from the electric current flowing in the magnetic sensor, and the polarization process which cools off is performed while heating at a lower temperature than the blocking temperature at which the one direction anisotropism disappears and the magnetic field is applied.

In accordance with the present invention, it is desirable to provide at least of one of following features.

The saturation flux density of said second hard magnetic layer is smaller than the saturation flux density of the first hard magnetic layer.

The thickness of the hard magnetic layer is 3 nm to 20 nm.

The second hard magnetic layer consists of nickel 50–85 atom %, ferrum 15–20 atom %, and the remainder thereof being selected from at least one element of the group consisting of chromium, vanadium, titanium, copper, aurum, silver, an element of the platina family, tantalum, niobium, zirconium and hafnium, so as to contain 35% or less in total, and wherein the saturation flux density is less than 0.9 Tesla.

At least one of the first and the third hard magnetic layers consists of a magnetic material having saturation flux density of 1.0 Tesla or greater containing Co as the main component.

The Cr alloy antiferromagnetism membrane has a configuration such that the crystal grating of the body-centered cubic structure or the CsCl type configuration is distorted in the range of 0.1 to 10%.

Heat treatment makes the Cr alloy antiferromagnetism film distorted.

The Co alloy consists of Co, Ni and Fe, and the composition thereof is Co 30 to 98 atom %, Ni 0 to 30 atom % and Fe 2 to 50 atom %, especially Co 85 to 95 atom %, Fe 5 to 15 atom %, or Co 50 to 70 atom %, Ni 10 to 30 atom %, and Fe 5 to 20 atom %. The Co alloy consists of Co, Ni, Fe and additional element X, and a total of Co, Ni, Fe is 70 to 98 atom %, and the X is 2 to 30 atom % and is either one or more of Cu, Cr, V, Ti, Ta, Nb, Zr, Hf and an element of the platina family.

The oxide film is formed by a heat treatment, a film formation technology or ion implantation etc. on the Cr alloy antiferromagnetism membrane surface.

The means to fix the magnetization direction of the second magnetic layer of the ferromagnetic body is the second magnetic layer of the ferromagnetic body having a higher saturation magnetic coercive force than the first magnetic layer of the ferromagnetic body.

The means to fix the magnetization direction of the second magnetic layer of the ferromagnetic body is the antiferromagnetism layer coming in contact with the second magnetic layer of the ferromagnetic body directly.

The means to fix the magnetization direction of the second magnetic layer of the ferromagnetic body is the hard magnetic layer which comes in contact with the second magnetic layer of the ferromagnetic body directly. The magnetization direction of the thin film layer of the individual ferromagnetic body for a direction of the current is determined so that the anisotropic magnetic resistance is added to the electric resistance variation of the magnetoresistance effect element resulting from a rotation of the magnetization of the magnetic layer of the individual ferromagnetic body.

The magnetization direction of the thin film layer of the individual ferromagnetic body for a direction of the current is determined so that the anisotropic magnetic resistance is added to the electric resistance variation of the magnetoresistance effect element resulting from a rotation of the magnetization of the first magnetic layer of the ferromagnetic body.

A means to produce a bias in the longitudinal direction sufficient to maintain the first magnetic layer of the ferromagnetic body in the single domain condition is provided further. The means for producing the bias in the longitudinal direction is based on the antiferromagnetism layer coming in contact directly only in the end domain of the first magnetic layer of the ferromagnetic body. The means for producing the bias in the longitudinal direction is based on the hard magnetism layer coming in contact directly only in the end domain of the first magnetic layer of the ferromagnetic body.

DETAILED DESCRIPTION OF THE PREFERRED EMBODIMENT (Embodiment 1)

FIGS. 1A, 1B, 1C to FIG. 5 show the structures near the recording head portions of magnetic heads, as seen from a floating surface. Under an upper shield film 11 there is an MR film or a GMR film, which operates as a regenerating head portion. The substrate is not specially limited, but it is preferable if the substrate has a small surface roughness (smaller than 5 nm).

Figure 1A:
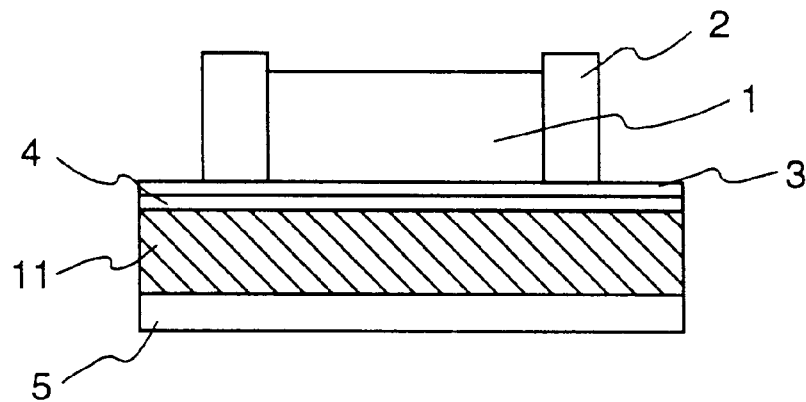
FIGS. 1A, 1B, 1C are diagrammatic views, as seen from a floating surface, of a recording head in which a high resistivity film is used for one part of the lower magnetic film.
Figure 1B:
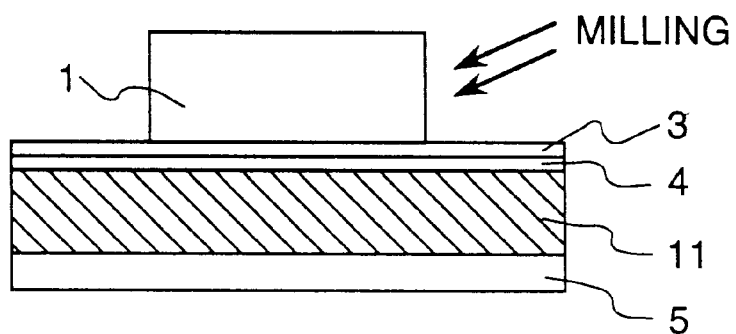
Figure 1C:
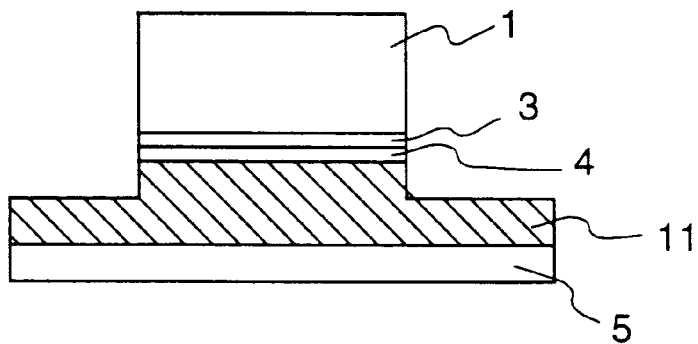

As shown in FIGS. 1A, 1B, 1C, a film 11 of high specific resistance (above 80 $\mu\Omega$cm), Bs>1.5 T and magnetostriction (absolute value) $<1\times10^{-7}$ is formed on a surface of the lower magnetic film 5 by a sputtering method, and a non-magnetic film having a thickness of 0.1 to 0.2 $\mu$m is formed thereon by the sputtering method to be used as the gap film 4. As a magnetic film satisfying such characteristics, a high specific resistance film can be obtained by adding oxygen or nitrogen to Fe, FeCo or an FeNiCo alloy, and also by adding an element having a strong affinity with oxygen or nitrogen at the same time.

Further, the magnetostriction constant can be controlled by adding other alloy elements, and also depends on the concentration of oxygen or nitrogen. Further, a base 3 for a plated film is formed on the high specific resistance film by the sputtering method.

This base 3 may be a high specific resistance film and the film thickness may be thinner than 100 nm. Resist frames 2 are formed on the base 3, and the upper magnetic film 1 is formed by a plating method. The track width is determined by the distance between the frames, and it has been confirmed that the upper magnetic film 1 can be manufactured to a 0.5 µm thickness without composition variation through the frame plating method, and a head having a track width of 0.5 to 1.5 µm has been manufactured. A resist frame 2 is manufactured by masking using an oxide, such as $SiO_2$, through the RIE (reactive ion etching) method. In the frame plating method, the upper magnetic film 1 is an alloy film formed with a main component of Fe, NiFe, CoFe or CoNiFe having a specific resistance smaller than 60 µΩcm. It is possible to obtain the structure shown in FIG. 5 by forming a part of the upper magnetic film manufactured through this plating method as a high specific resistance film. Further, the side fringe can be reduced by removing the base 3 and the gap film 4 and a part of the lower magnetic film (the upper shield film of MR or GMR) without re-attaching through the milling method or the RIE method with masking using the upper magnetic film 1. In a case of using the RIE method, it is possible to etch nearly vertically with masking using the upper magnetic film by optimizing the kind of gas, the gas pressure and the etching rate. By setting the film thickness of the high specific resistance film to 0.5 to 3 times as thick as the film thickness of the gap film, the degrading of the recording performance at high frequency can be suppressed. The film thickness of the upper magnetic film is 2 to 3 µm, and it is difficult to form all of the upper magnetic film as a high specific resistance plated film. The reason is that it is difficult to control the plating bath since a plated film satisfying all the characteristics has a large film stress, and, consequently various kinds of additives for high resistance and an additive agent for stabilizing the plating bath are used, and it is more difficult to adjust the magnetostriction than in the sputtering method. However, it is possible to manufacture a recording head having the structure shown in FIG. 5, where a part of the upper magnetic film is formed of a high specific resistance film.

Figure 3A:
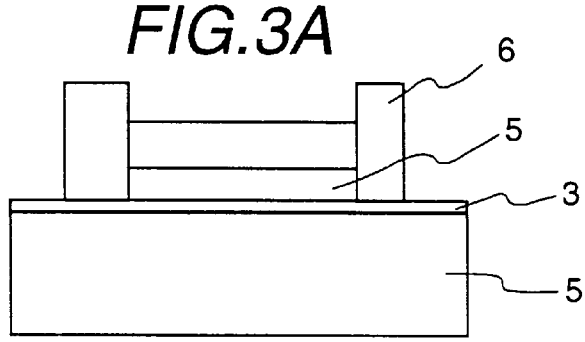
FIGS. 3A, 3B, 3C are diagrammatic views, as seen from a floating surface, of a recording head in which a high resistivity film is used for one part of the upper magnetic film.
Figure 3B:
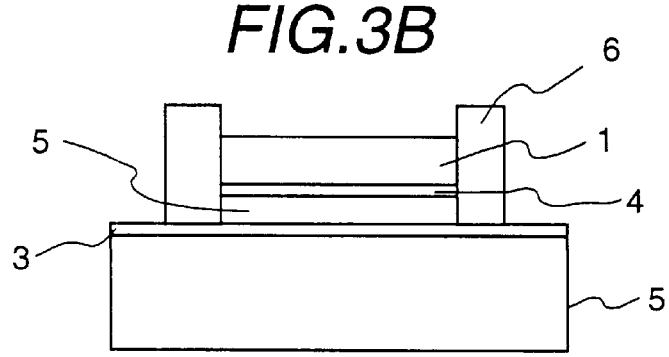
Figure 3C:
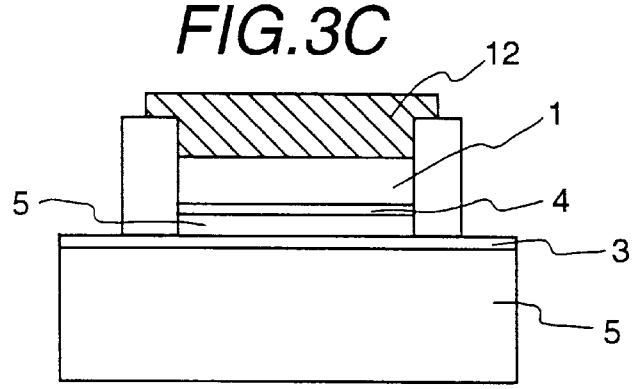

As shown in FIGS. 3A, 3B, 3C, it is possible for the films above and below (the upper magnetic film 1 and the lower magnetic film 5) the gap membrane 4 to be manufactured by the plating method, and the high specific resistance film 12 to be manufactured on a part of the frame and on the upper magnetic film 1 by the sputtering method. In this case, the gap film 4 is a conductive non-magnetic film (made of a Cr alloy or the like). The frame is made of an oxide, such as $SiO_2$, and there is no frame removing process as shown in FIG. 1B, and accordingly the frame remains on the floating surface as it is. Further, the height of the frame may be near the thickness of the upper magnetic film 1. The upper magnetic film 1 and the lower magnetic film 5 are thinner than 3 times the thickness of the gap film 4.

Figure 2A:
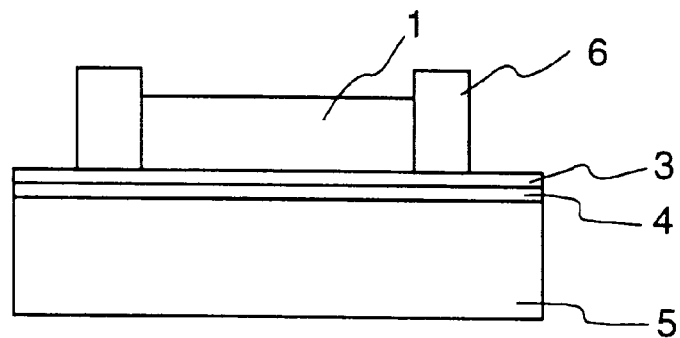
FIGS. 2A, 2B are diagrammatic views, as seen from a floating surface, of a recording head in which a high resistivity film is used for one part of the upper magnetic film.
Figure 2B:
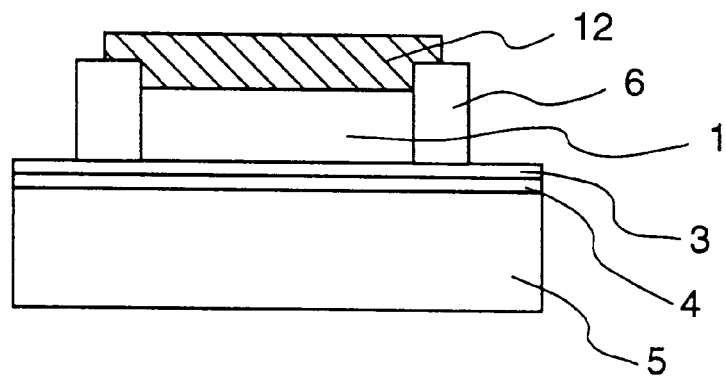

As a recording head having a similar structure to that of FIGS. 3A, 3B, 3C, as shown in FIGS. 2A, 2B, after forming the gap 4 and the base 3 through the sputtering method, the frame 6 is formed of an oxide, such as $SiO_2$, and a low specific resistance ferromagnetic film is formed as the upper magnetic film 1 through the plating method. Then, the high specific resistance film 12 is formed on a part of the frame 6 and on the upper magnetic film 1 through the sputtering method, similar to FIGS. 3A, 3B, 3C. In this case, since the width of the lower magnetic film 5 is wider than the width of the upper magnetic film 1 (the track width), the side fringe becomes larger than in the other methods.

Figure 4:
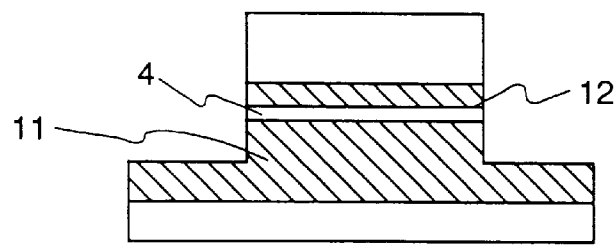
FIG. 4 is a diagrammatic view, as seen from a floating surface, of a recording head in which a high resistivity film is used for one part of the upper and the lower magnetic films.

The structure of FIG. 4 is similar to that of FIG. 1C, but a thin high specific resistance film 12 is also formed on the gap membrane 4 by the plating method. The film thickness is 0.5 to 3 times as thick as that of the gap membrane 4. When the film thickness is within this range, the effect of a high specific resistance can clearly appear in the recording performance, and the structure can be manufactured by the plating method. The high specific resistance plated film 12 is a ferromagnetic alloy film containing elements such as P, B, C) and so on. Further, as shown in FIG. 5, it is possible for a part of an upper shield film 11 and a part of the upper magnetic film 12 to be formed as a high specific resistance (above 80 µΩcm) film through the sputtering method.

Figure 5:
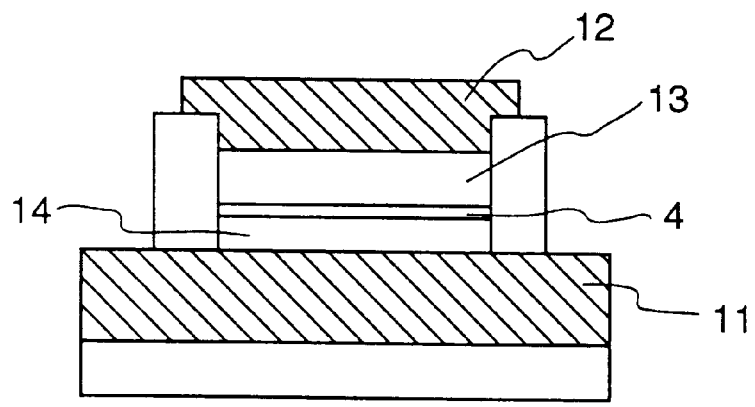
FIG. 5 is a diagrammatic view, as seen from a floating surface, of a recording head in which a high resistivity film is used for one part of the upper and the lower magnetic films.
Figure 6A:
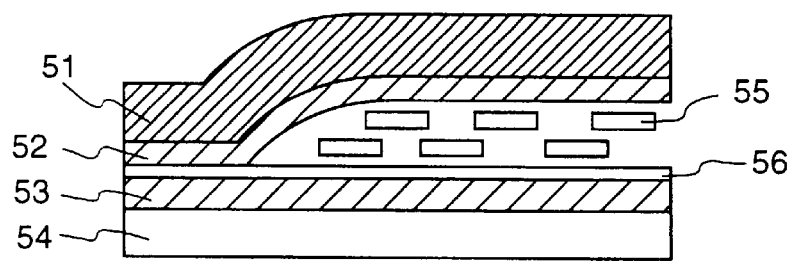
FIGS. 6A, 6B, 6C, 6D, 6E are sectional views, is viewed perpendicularly to a floating side of the recording head, in which a high resistivity film and a high saturation flux density film are used for one part of a magnetic pole.
Figure 6B:
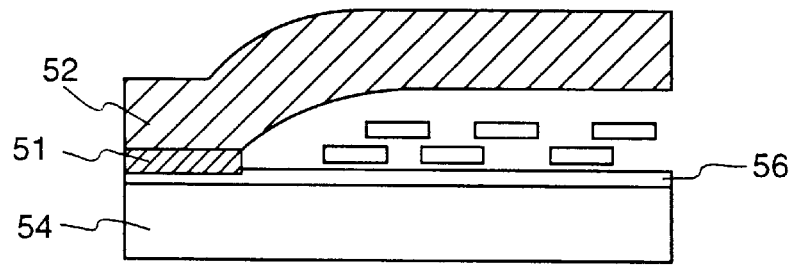
Figure 6C:
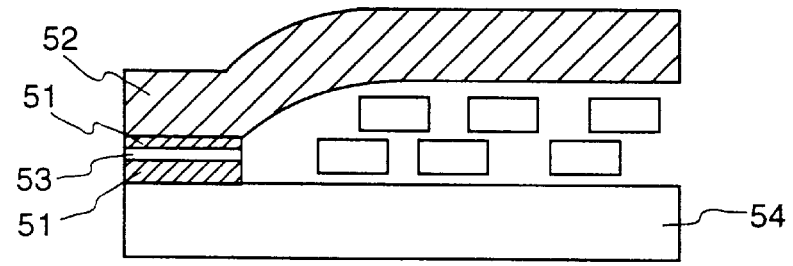
Figure 6D:
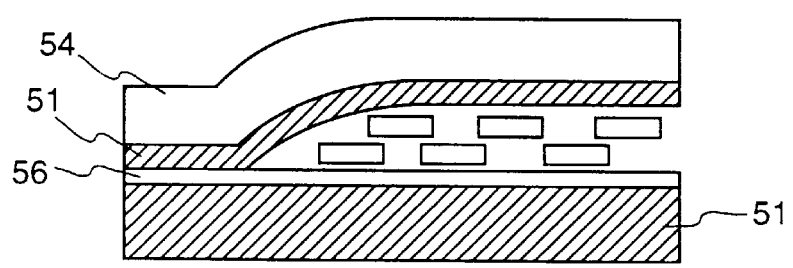
Figure 6E:
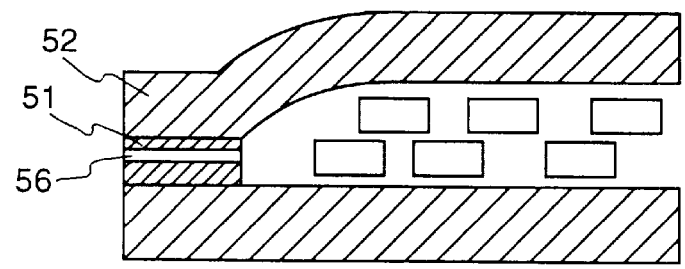

FIG. 5 is a configuration of a recording head as seen from the floating side, and the configuration of the surface which cuts through this head in a vertical direction from the floating side is shown in FIG. 6E.

The lower magnetic pole and the upper magnetic pole are constructed to have a multilayer configuration, and the top and bottom magnetic films 13, 14 that came in contact with the gap membrane 5 may be provided by the galvanizing method. The top and bottom magnetic films 13, 14 are the membranes in which a 3d transition metal chemical element is added to the NiFe alloy, CoNiFe— (Pt, Pd) alloy or an alloy thereof. The gap membrane may be made using a frame in the same manner as the top and bottom magnetic films 13, 14. The magnetism characteristic of top and bottom magnetic films 13, 14 include a Bs of more than 1.0 T, a resistivity of less than 60 µΩcm, a Hk of less than 20 Oe and a magnetostriction constant (lambda) of $1 \times 10^{-5}$ or less. The film thickness of the top and bottom magnetic films 13, 14 is 3 times or more of the thickness of the gap membrane, respectively, and the film thickness of the gap membrane is 0.1 µm. The gap membrane is provided as a non-magnetic electrical conduction membrane, such as a CrNi alloy, a CuCr alloy, a NiW alloy or a noble metal membrane.

The high resistivity magnetic films 11, 12 may be provided by a sputtering method, and they consist of laminated layers of NiFe and $Al_2O_3$, mixed layers of a NiFe membrane and an $Al_2O_3$, or mixed layers of NiFeN and $Al_2O_3$ or a multilayer membrane of NiFeN and $Al_2O_3$. Thus, the composition and membrane constitution thereof are controlled so that the resistivity of the membrane becomes higher than that of the top and bottom magnetic films 13, 14.

Since the technique of using a multilayer or mixed layer is used in order to make the resistivity high, the saturation flux density of the membrane falls and becomes smaller than that of the top and bottom magnetic films 13, 14 made by the galvanizing method. That is, the saturation flux density of the top and bottom magnetic films 13, 14 in contact with the gap membrane 4 becomes higher than the high resistivity membrane.

In order to make the magnetic field strength on the gap membrane of the floating side higher, the high saturation flux density membrane had better be disposed in the gap membrane neighborhood as in the embodiment described above.

The film thickness of the high resistivity membrane 12 is about 3 µm. Moreover, the width of the high resistivity upper magnetic film 12 and the high resistivity lower magnetic film 11 is larger by about 0.5 to 1 µm than the membrane of the top and bottom magnetic films 13, 14, and the width of the top and bottom magnetic films is about 0.5 µm so that as shown in FIG. 5, the wider film 12 in combination with the narrow film 13 and the wider film 11 in combination with the narrower film 14 provide a convex shape.

Except for the frame of $SiO_2$ used in the galvanizing, a resist frame is used and the resist is removed after the galvanizing. A part, except for the top and bottom magnetic films 13, 14 is covered with a protective film ($Al_2O_3$ and $SiO_2$ etc.), and a high resistivity hard magnetic membrane of large width is formed on the top and bottom magnetic films and the protective film.

A coil consists of two layers in FIG. 6E, however one layer also may be used. A sectional view in a vertical direction of a sliding surface of the recording head is shown in FIGS. 6A, 6B, 6C, 6D, 6E. FIGS. 6A, 6B, 6C, 6D, 6E show sectional views corresponding to FIGS. 1A, 1B, 1C, FIG. 2A, 2B, FIG. 3A, 3B, 3C, FIG. 4, FIG. 5.

In FIG. 6A, the upper magnetic film consists of one layer of magnetic film, the lower magnetic film consists of two layers of magnetic film, and the one layer of the lower magnetic film near the gap membrane 56 is a high resistivity membrane. The coil 55 is disposed between insulation membranes on the gap membrane 56, and the magnetic field is generated from the floating side by an electric current flowing in the coil.

In the configuration shown in FIG. 6B, the lower magnetic film consists of one layer of magnetic film, the upper magnetic film consists of two layers of magnetic film, and the one layer of the upper magnetic film near the gap membrane 56 is a high saturation flux density low resistivity membrane 51. The high saturation flux density low resistivity membrane makes it with gilt method is made by the galvanizing method and the width of the magnetic film defines the track width. The high saturation flux density low resistivity membrane 51 is formed only on the floating side of the upper magnetic film, and the width of the high saturation flux density low resistivity membrane 51 as viewed from the floating side is narrower than the high resistivity magnetic film 52. The configuration shown in FIG. 6B is more suitable for providing a narrow track easily in comparison to the configuration shown in FIG. 6A.

In FIG. 6C, the lower magnetic film and the upper part magnetic film each consist of two layers of magnetic film. The lower magnetic film consists of a high saturation flux density low resistivity membrane 51 and a hard magnetic membrane 54 positioned thereunder, and the upper magnetic film consists of a high saturation flux density low resistivity membrane 51 and a high resistivity magnetic film 52. The high saturation flux density low resistivity membrane 51 and the gap membrane 56 are made by the galvanizing method, and the high resistivity magnetic film 52 is made by the sputtering method.

In the configuration shown FIG. 6C and FIG. 6E, the saturation flux density low resistivity membrane 51 is used above and below the gap membrane 56, and the width as seen from the floating side may be made narrower than the width of other magnetic films. This configuration is effective for a recording head having a narrow track, and the high saturation flux density membrane is used in the gap neighborhood. Therefore, the magnetic field strength becomes higher, and the radio frequency characteristic is good, similar to using a magnetic film of high resistivity.

FIG. 6D shows the high saturation flux density membrane 51 forming the whole magnetic pole above and below the gap membrane 56. If only the floating surface is formed as a narrow track, as shown in FIG. 4, the process in which only the floating side is formed by the galvanizing method need not be used.

FIG. 6E shows a similar configuration as FIG. 6C, in which the high saturation flux density low resistivity membrane is positioned in contact with gap membrane 56, and the high resistivity magnetic film 52 is used for the magnetic pole material, with the result that the radio frequency characteristic thereof is excellent and the track width can be reduced to less than 1.0 $\mu$m.

In the respective configurations of FIG. 6A, FIG. 6B, FIG. 6C, FIG. 6D, and FIG. 6E, the high saturation flux density low resistivity membrane 51 has a higher saturation flux density than that of the magnetic pole material used for other parts in each recording head, and the resistivity thereof is smaller than that of the material of other magnetic pole parts.

As the material used for the high saturation flux density low resistivity membrane 51, for example, a CoNiFe alloy, a NiFe alloy or a material to which a 3d transition metal chemical element is added in these alloy can be used. As the gap membrane 56, a non-magnetic electrical conduction membrane may be used when making it by a galvanizing method, an oxide such as $Al_2O_3$ or $SiO_2$ may be used when making it by other methods, or even a nitride, carbide or any mixing material thereof may be used.

The configuration of examples of a recording head similar to the configurations of FIG. 6A, FIG. 6s, FIG. 6C, FIG. 6D, and FIG. 6E are shown in FIG. 7A, FIG. 7B, FIG. 7C, and FIG. 7D.

Figure 7A:
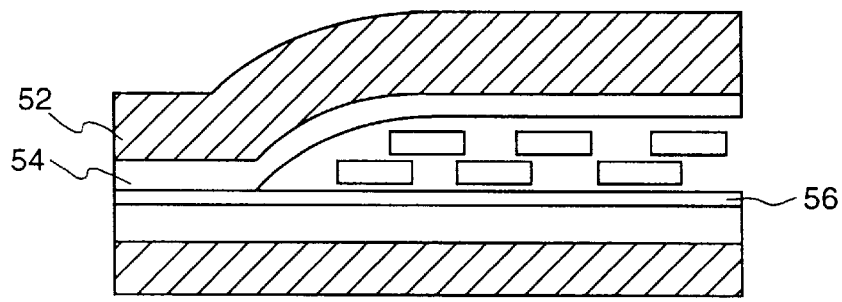
FIGS. 7A, 7B, 7C, 7D are sectional views, as viewed perpendicularly to a floating side of the recording head, in which a high resistivity film is used for one part of a magnetic pole.

In FIG. 7A, a magnetic film is provided above and below the gap membrane 56 and on either side thereof is a high resistivity magnetic film 52. A hard magnetic membrane 54 having a smaller resistivity than that of the high resistivity magnetic film 52 is disposed on either side of the magnetic gap. The volume of the high resistivity magnetic film 52 is larger than the volume of the hard magnetic membrane 54 having a low resistivity, and the radio frequency characteristic is improved in comparison to the case in which the high resistivity membrane is not used.

Figure 7B:
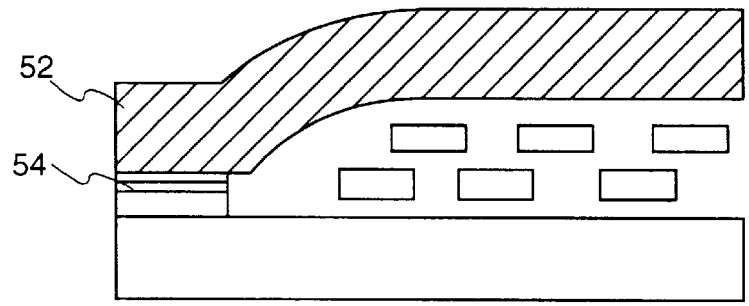

In FIG. 7B, the magnetic film which comes in contact with a gap membrane and other gap membrane is formed with a narrow track, and the magnetic film thereon is constructed of a high resistivity magnetic film 52, thereby a good recording head providing a narrow track and an improved radio frequency characteristic may be offered.

Figure 7C:
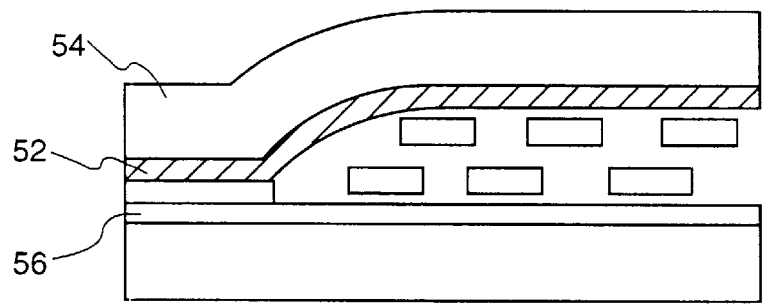

In FIG. 7C, the upper magnetic film consists of three layers. The gap membrane 56 is made at a flat part, a magnetic film whose width is narrow is provided thereon, and the high resistivity magnetic film 52 is formed through the magnetic film. A hard magnetic membrane 54 having a low resistivity is provided on the high resistivity magnetic film 52. The magnetic field strength of the floating side can be increased by making the saturation flux density of the hard magnetic membrane 54 having this low resistivity higher.

Figure 7D:
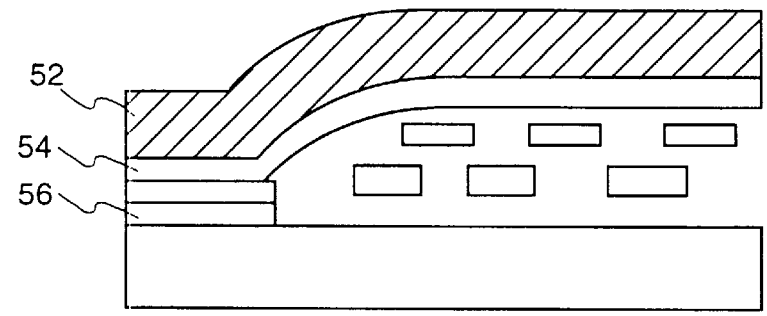

A recording head configuration resembling FIG. 7C is shown in FIG. 7D, wherein the upper magnetic film consists of three layers, including a hard magnetic membrane 54 of low resistivity provided can a part near the gap membrane 56 and high resistivity magnetic film 52 provided on the membrane 54, with the result that the saturation flux density of the material in the gap neighborhood is capable of being higher than that in FIG. 7C, and a head having a high magnetic field strength may be offered.

Figure 8A:
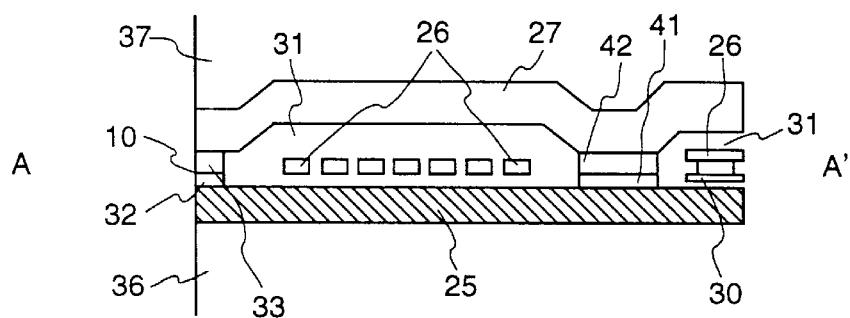
FIGS. 8A, 8B, 8C are diagrams which show cross-section, top and side views of a magnetic head of the present invention.

FIG. 8A shows a section of a magnetic head having the new configuration of the present invention. A coil 26 is provided between the lower core 25 and the upper core 27 and consists of Al or Cu with a thickness of 2 $\mu$m. A non-magnetic insulating material 31 is filled in the space between these elements with an object to maintain the electric insulation between the coil 26 and the cores 25, 27. The coil 26 is enveloped between the lower core 25 and the upper core 27 and is formed of an Al or Cu film having a thickness of 2 $\mu$m. A non-magnetic insulating material 31 is filled between the coil 26 and the cores 25, 27 to electrically insulate between them.

The magnetic head in accordance with the present invention is characterized by the fact that magnetic pole members 32, 33 and an insulating non-magnetic film 10 are inserted between the upper core 27 and the lower core 25, a magnetic gap (or recording gap) being formed by these members. Further, another characteristic is that magnetic path members 41, 42 are provided between the upper core 27 and the lower core 25. However, this structure is not necessary to realize the present invention. The magnetic path members 41, 42 are preferable to flatten the upper core 27 and have an effect to reduce any stress (magnetostriction) remaining after manufacture. By forming the members together with the magnetic pole members 32, 33, an increase in the manufacturing cost can be prevented.

Figure 8B:
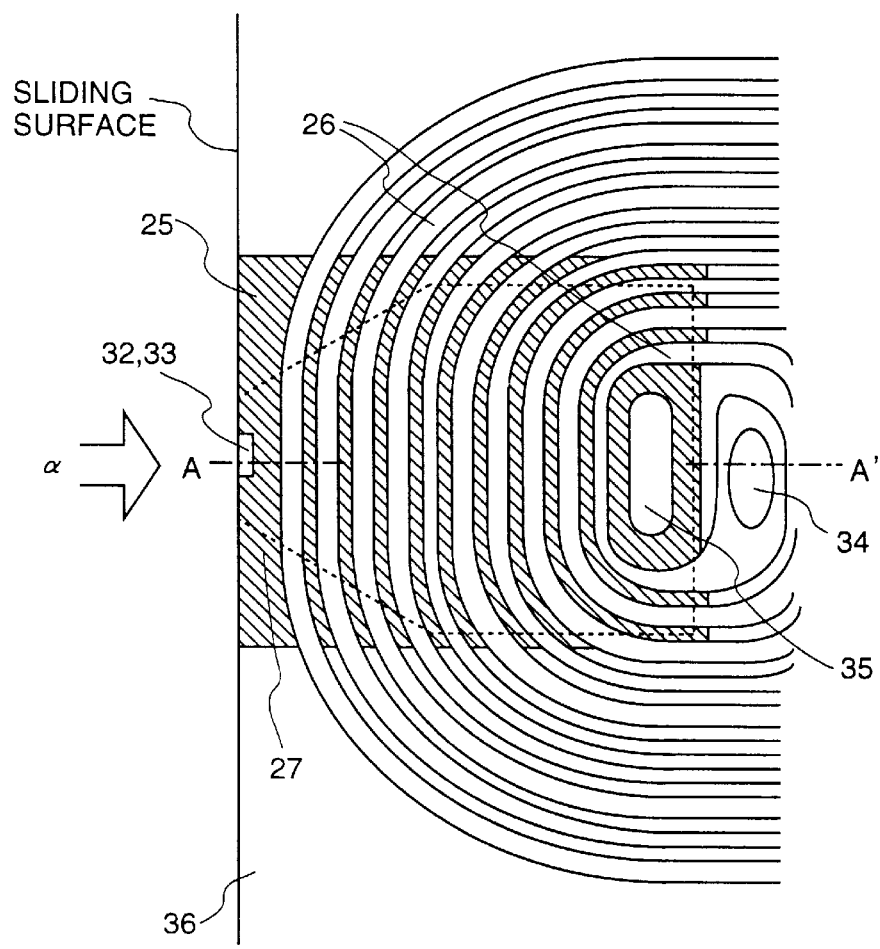

FIG. 8B is a top view showing the magnetic head as seen from the upper core side. It can be understood that the coil 26 is wound in a spiral shape. The coil 26 is connected to an electrode 30 (FIG. 8A) in a contact zone 34. Further, the upper core 27 and the lower core 25 are connected in a magnetic contact zone 35. The magnetic contact zone 35 is constructed to include the magnetic path members 41, 42 described above.

Figure 8C:
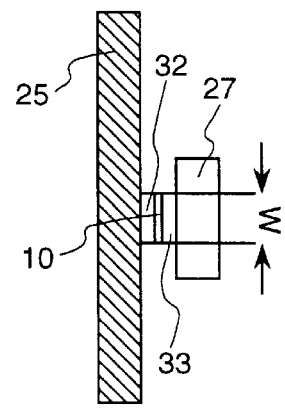

The insulating non-magnetic film 10 characterized by the present invention is placed at a position at the ends of the upper core 27 and the lower core 25, and the structure of the members as seen from the direction $\alpha$ is as shown in FIG. 8C. That is, the magnetic pole members 32, 33 having a narrow width are interposed between the upper core 27 and the lower core 25, and further the insulating non-magnetic film 10 is placed between the members. The magnetic pole members 32, 33 are magnetically integrated with the ends of the magnetic poles of the upper core 27 and the lower core 25, respectively. Therefore, a gap portion is formed by the magnetic poles respectively having the projecting portion.

Further, FIG. 8C agrees with the magnetic pole structure as seen from a plane of the magnetic head facing the recording medium, and it can be understood from the figure that the upper magnetic pole 27 has a projecting shape and the projecting portion is formed toward the lower magnetic pole 25.

Further, from FIG. 8C, it can be understood that both of the magnetic poles have a projecting shape, and particularly the width of the projecting portion of the upper magnetic pole is nearly equal to the width of the projecting portion of the lower magnetic pole. Furthermore, in the case of the present invention, the height of the projecting portion is set to approximately 0.8 $\mu$m, and the width of the projecting portion is set to approximately 1 $\mu$m. From this relationship, it can be seen that the height of the projecting portion is lower than the width of the projecting portion.

Figure 9:
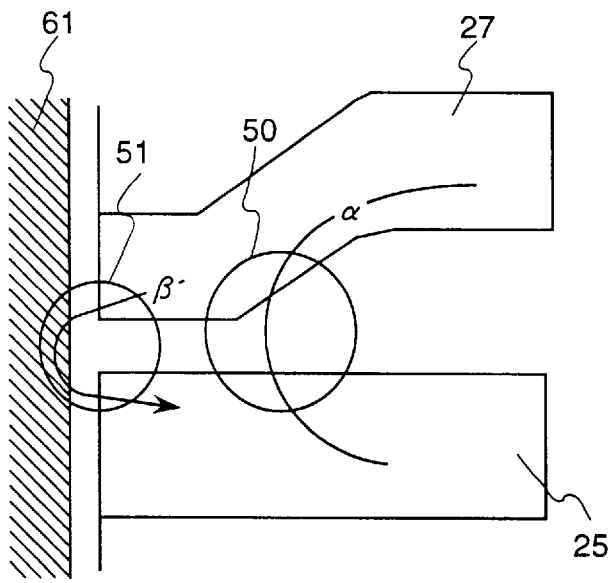
FIG. 9 is a diagram which illustrates a problem in a conventional magnetic head.

The structure of the present invention can reduce the resistance of the magnetic path to the same extent as that of Japanese Patent Application Laid-Open No. (7-296328). Description of the prior art will be made, with reference to FIG. 9, which is a cross-sectional view of a conventional magnetic head which does not have the magnetic pole members 32, 33. The figure shows a magnetic gap disposed between the lower core 25 and the upper core 27. Writing-in magnetic flux to a medium 61 is conducted on a path indicated by $\beta$. However, when the width of the gap (magnetic pole width) of the end side of the upper core 27 is narrowed, the magnetic path resistance is increased and by this effect the magnetic flux becomes to flow through a path indicated by $\alpha$ in a region 50 where the magnetic path resistance is increased. Thereby, the amount of magnetic flux conducted to the gap end portion 51 is decreased and a necessary amount of magnetic flux cannot be extracted from the gap (magnetic pole) ends.

Figure 10:
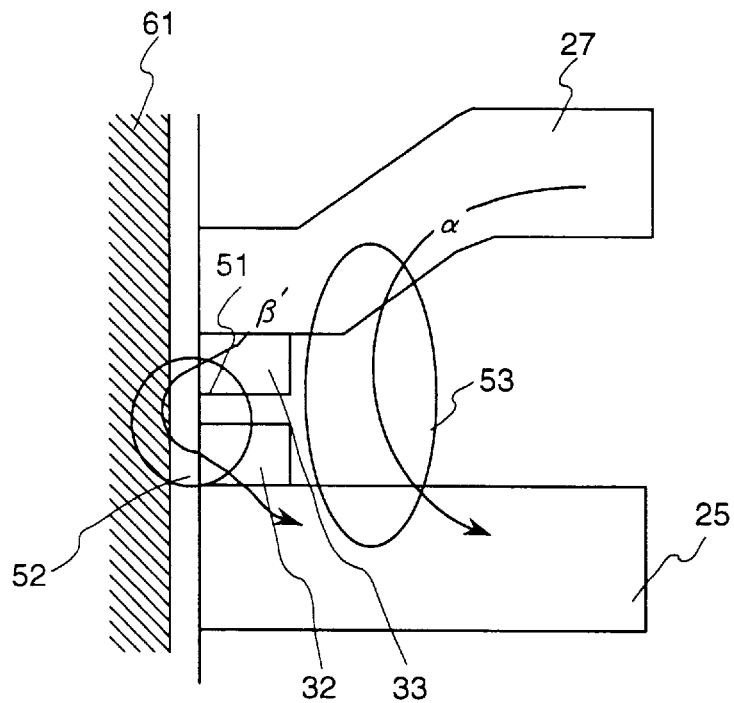
FIG. 10 is a diagram which illustrates an effect of the present invention.

On the other hand, in a case of the magnetic head of the present invention, as shown in FIG. 10, there are magnetic pole members 32, 33 disposed between the upper core 27 and the lower core 25. Therefore, the path $\alpha$ can be increased by the thickness of the members (the non-magnetic region can be widened). By this effect, it is possible to suppress the amount of magnetic flux flowing through the path a even if the magnetic path resistance is increased by narrowing the width of the magnetic poles.

The above-mentioned effect can be observed with a writing-in frequency above 150 MHz. This is an effect of the present invention obtained by using the insulating non-magnetic film in the magnetic gap. Further, in a case where an amorphous high electric resistance magnetic film, such as CoTaZr or the like, is used for the magnetic pole material, the writing-in frequency can be increased up to 200 MHz. In the structure disclosed in Japanese Patent Application Laid-Open No. 7-296328, since the trench structure forming the projecting portions is made of a low electric resistance material, an eddy current is easily generated in this portion and accordingly the upper limit of the writing-in frequency is limited to 100 MHz.

As shown in FIG. 8C, the width W of the magnetic pole members 32, 33 is narrower than the width of the upper magnetic pole 27 and the width of the lower magnetic pole 25. This is the base that the magnetic pole has the projecting portion. By the effect of this shape, the magnetic flux is concentrated in the projecting portions opposite to each other. Therefore, under a condition in which the magnetic field from the projecting portion is adjusted so as to agree with the magnetic field necessary for writing-in by adjusting the coil current (writing-in current), writing cannot occur in the region except for the projecting portion (in the region where the gap dimension becomes wide). Therefore, the track width to be written can be brought to agree with the width of the projecting portion.

Further, in accordance with the present invention, only the projecting portions need be made of a high electric resistance and high saturation magnetizing material, and thereby a strong magnetic field can be generated in the region corresponding to the width of the projecting portion. By this effect, the writing-in track width can be efficiently limited to the width of the projecting portion even if the magnetic pole has a projecting shape.

Further, since the height of the projecting portion is lower than the width of the projecting portion, the width of the projecting portion can be made smaller than 2 $\mu$m by a process to be described later. By this effect, the width of the writing in a medium can be easily reduced to 2 $\mu$m or smaller.

Furthermore, in the case of the present invention, since the width of the writing-in is determined by the width of the projecting portion, there is no need to particularly narrow the width of the upper core 27 and the width of the lower core 25 in order to realize high density recording. By this effect, the necessary magnetic field can be efficiently conducted to the magnetic pole end portion (the gap portion) without increasing the magnetic path resistance.

Figure 11A:
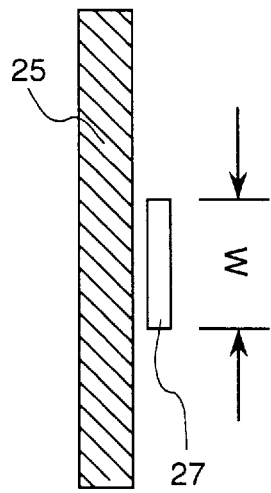
FIGS. 11A, 11B, 11C are diagrammatic views of the magnetic pole configuration viewed from a sliding surface side of the conventional magnetic head.
Figure 11B:
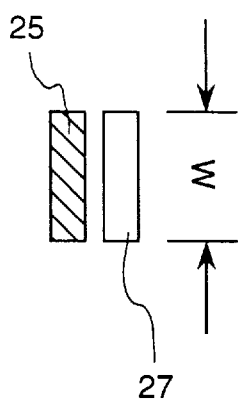
Figure 11C:
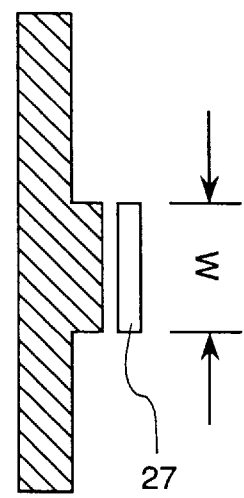

In the case of a conventional magnetic head using an insulating non-magnetic film in the magnetic gap, the shapes of the magnetic heads can be roughly classified into three kinds, as shown in FIG. 11A, FIG. 11B and FIG. 11C, in which the magnetic poles are seen from the sliding surface side. That is, there is a magnetic head constructed by magnetic poles 27, 25 having different lengths, as shown in FIG. 11A; there is a magnetic head constructed by magnetic poles 27, 25 having the same length, as shown in FIG. 11B; and there is a magnetic head having a projection in one of the magnetic poles 25. The magnetic head of FIG. 11B is an improvement over the magnetic structure of FIG. 11A, and has a characteristic of providing a small magnetic field leakage in the track width direction, since the lengths of the magnetic poles are equal to each other. Therefore, it is advantageous in writing on a narrow track. However, this structure has a disadvantage in that the magnetic pole 25 cannot be also used as a shield layer for a magneto-resistance effect element. A countermeasure of the disadvantage is the structure shown in FIG. 11C.

In order to realize a narrow track in the structure shown in FIG. 11C, the width W needs to be narrowed. Therefore, the writing-in magnetic flux is decreased due to an increase in the magnetic path resistance as described with reference to FIG. 9. Accordingly, it is impossible to write high density information with a high efficiency.

Since, in the structure in accordance with the present invention, the width of the writing-in gap portion is limited by the width of the projection portion, spreading of the leakage magnetic field toward the track width direction is small, similar to that of the magnetic poles shown in FIG. 11B. Therefore, the structure in accordance with the present invention is suitable for high density recording. Further, since the width of the lower core is greater than the width of the projecting portion, there is no problem in that the lower core is also used as a shield layer for a magneto-resistance effect element. As has been described above, the magnetic head structure in accordance with the present invention has no problems in connection with high density recording of the type which are inherent in the conventional magnetic head.

A manufacturing process for a magnetic head of the present invention, which is capable of realizing such an excellent performance, will be described below with reference to FIG. 12A to FIG. 12D.

The figures show features of the method of forming the end of the magnetic pole of the magnetic core as seen from the direction "α" in FIG. 8B. The processes will be sequentially described below, referring to the figures.

Figure 12A:
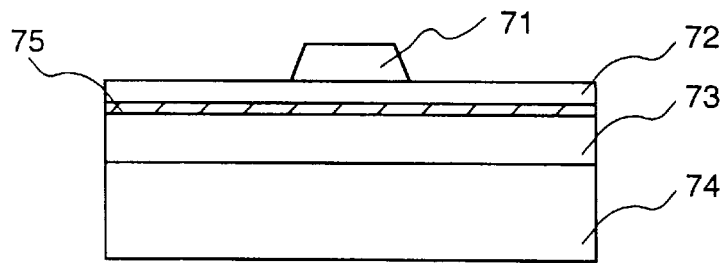
FIGS. 12A, 12B, 12C, 12D are diagrammatic views for showing a process for manufacturing a main part of the magnetic head of the present invention.

In the process shown in FIG. 12A, a magnetic film 73 representing the lower magnetic pole is laminated on a substrate (or a base layer or a base structure) 74. As the magnetic film, a Ni—Fe alloy is used. The thickness of the film 73 is set to 2 μm. On the magnetic film 73, a gap membrane 75 and an alumina film 72 is laminated to a thickness of 0.3 μm and serves as an insulating non-magnetic film. Then, a Ni—Fe magnetic alloy film 72 having a thickness of 0.8 μm is laminated on the film 73. After completion of the laminating, a resist pattern 71 having a width of the projecting portion (corresponding to the writing-in track width) is formed through a photolithographic method. The thickness of the result is set to 1 μm.

Figure 12B:
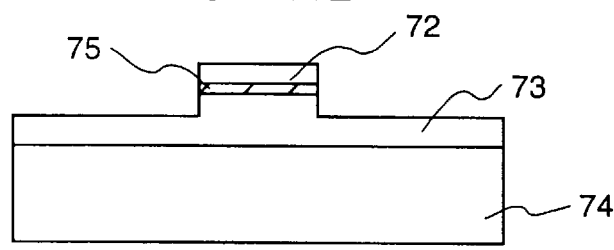

Next, in the process shown in FIG. 12B, the magnetic alloy film 72 is etched by an ion milling method with masking of the resist pattern 71 to form a portion to be formed in the projecting portion of the upper magnetic pole. Then, the alumina film is etched by a chlorine and fluorine reactive gas with masking of the resist pattern 71 and the projecting portion of the upper magnetic pole formed by the etching. After that, a projecting portion is formed in the lower magnetic pole by etching the lower magnetic pole through an ion milling method with masking of the member to be formed in the projecting portion of the upper magnetic pole. At that time, the depth of the etching is set to 0.8 μm. By etching the lower magnetic pole using an ion milling method with masking of the member to be formed in the projecting portion of the upper magnetic pole, it is possible to form projecting portions having the same length opposite to each other. This is effective to lessen spreading of the leakage magnetic field in the track width direction, and is an important element for the functioning of the present invention.

Figure 12C:
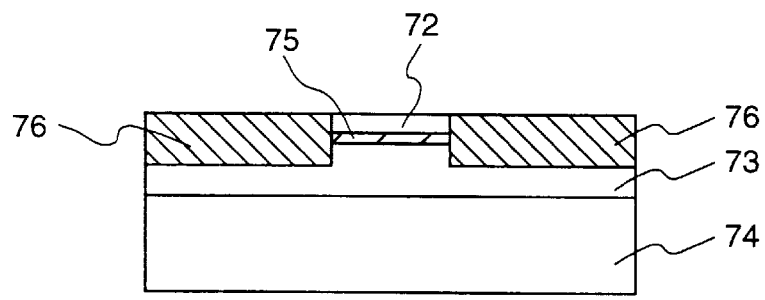

In the process shown in FIG. 12C, after laminating a non-magnetic insulating film 76 all over the surface, the laminated non-magnetic insulating film is flattened and a part of the member 72 which forms the projecting portion is exposed. This process can be realized by applying a fluid thermo-curing insulator used in the manufacturing of semiconductors (so-called spin-on-glass), performing the necessary heat treatment, and then mechanically lapping the surface of the substrate. As another method, it is possible to use thermo-fluidity of the resist.

It is a necessary condition for realizing the present invention that the member 72 which forms the projecting portion is exposed from the insulator layer. If a process can realize this necessary condition, the flattening process of the insulator layer is not required. For example, even if the thickness of the insulator member 76 exceeds the thickness of the member 72 to be formed in the projecting portion, it has been confirmed that the present invention is not affected. In such an extreme case (a condition where the thickness of the insulator member 76 exceeds the thickness of the member 72 to be formed in the projecting portion), an undulation is produced in the upper magnetic pole and it results in the projecting portion existing in a depressed portion. This structure is to be described later.

Figure 12D:
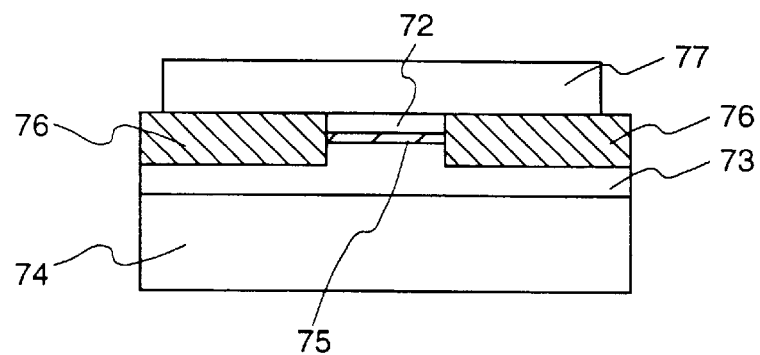

In the last process shown in FIG. 12D, the other members which make up the upper magnetic pole member are formed. A Ni—Fe alloy film 77 is used for the upper magnetic pole as in the conventional magnetic head.

By the processes described above, the magnetic structure shown in FIG. 8C can be formed. Although the Ni—Fe alloy film is used for the material for the magnetic pole in this embodiment, the magnetic head in accordance with the present invention can be formed by using another soft magnetic film through the same process as in this embodiment. Particularly, by using a high electric resistant soft magnetic film, writing-in under a high frequency condition can be realized. It is a characteristic of the present invention that the soft magnetic film can be formed depending on the electroplating method, and by this effect it is possible to perform writing at a high frequency exceeding that of the conventional magnetic head.

The structure of an upper magnetic pole having a depressed portion will be described below. The structure can be manufactured through processes of manufacturing a magnetic head, including at least the following process. The description will be made with reference to FIG. 12 similar to the previous explanation.

As shown in FIG. 12A, after laminating the lower magnetic material 73 on the base structure 74 of the magnetic head, an insulator non-magnetic film 75 is laminated, and then a material 72 forming a part of the upper magnetic pole is laminated. Then, a resist pattern 71 is formed in a region corresponding to the projecting portion of the upper magnetic pole through a lithographic method.

Then, as shown in FIG. 12B, a projecting portion is formed in the lower magnetic pole by etching the insulator non-magnetic film and the lower magnetic pole with masking by the resist pattern 71 and the member to be formed in the projecting portion of the upper magnetic pole.

After that, as shown in FIG. 12C, after forming members to be formed in the projecting portions in the upper and the lower magnetic poles, a non-magnetic insulating film 76 with a thickness exceeding the projecting portion is laminated over the region except for the projecting portion.

Although the figure shows that the surface of the insulator non-magnetic film 76 and the surface of the projecting portion (the surface of 72) seem to be at the same level, in this embodiment the thickness of the insulator non-magnetic film 76 extends beyond the surface of the projecting portion (the surface of 72).

Then, by forming the other members 77 representing remaining part of the upper magnetic pole member, as shown 12D, the objective magnetic pole shape of the head is manufactured.

Figure 13:
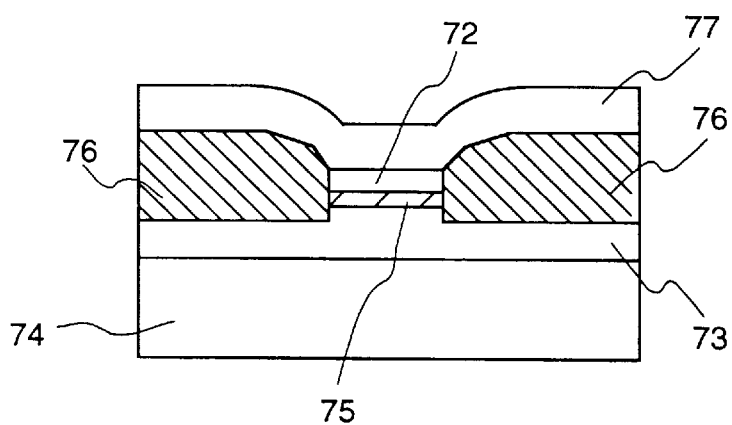
FIG. 13 is a diagrammatic view for showing a process for manufacturing a main part of the magnetic head of the present invention.

FIG. 13 shows the magnetic pole shape of the magnetic head manufactured through the manufacturing processes including at least the above-mentioned process. The figure clearly shows the shape of the upper magnetic pole 77 having the projecting portion in a depressed portion. It should be added that this shape is highly advantageous for efficiently conducting the magnetic flux of the upper magnetic pole into the projecting portion.

The magnetic head in accordance with the present invention is formed on a wafer obtained by machining a sintered body of alumina and titanium carbide. Then, after performing desired machining, a magnetic head slider is manufactured.

According to the above-mentioned processes, the width of the projecting portion determining the writing-in track width is determined by the width of the resist pattern. However, by making the height of the magnetic pole projecting portion of the present invention lower than the width of the projecting portion, a resist pattern having a large film thickness is not always necessary. From this effect, the patterning resolution is easier compared to the resist pattern of a plating mask pattern, and the width of the projecting portion can be made smaller than 2 $\mu$m. By this characteristic, a magnetic head to used for a narrow track can be easily manufactured.

By employing a head slider composed of the magnetic head, it is possible to attain high density recording with a track width smaller than 2 $\mu$m. By this effect, it is possible to realize a high density magnetic recording apparatus of 5 Gb/in$^2$ or more which has been thought to be impossible prior to the present invention. This results in an effect that the magnetic flux can be efficiently conducted up to the end portion of the magnetic pole, and an effect is produced by which the ends of the magnetic poles are constructed by magnetic poles respectively having a projecting portion.
(Embodiment 2)

Figure 14A:
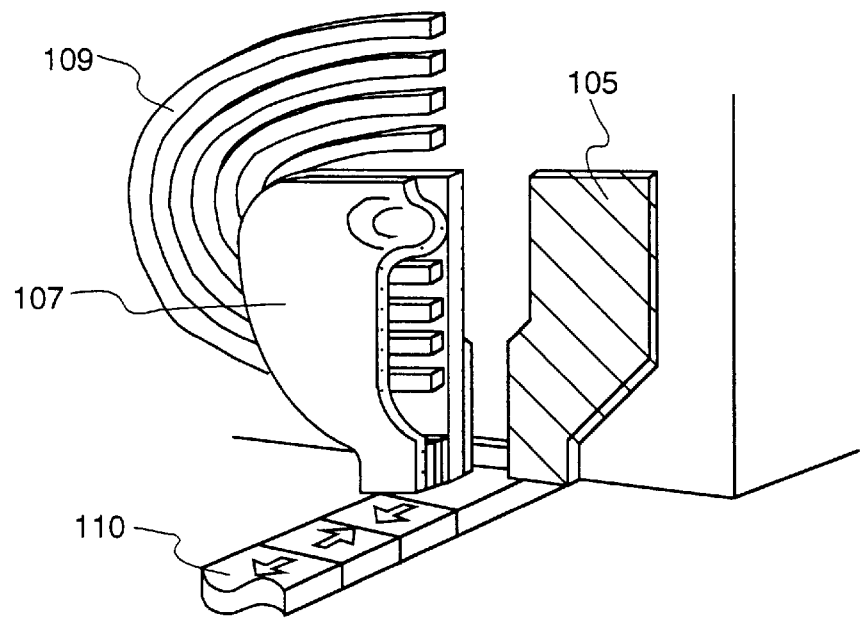
FIGS. 14A, 14B are perspective views of a portion of a recording reproducing head in which is used a high resistivity film or a high saturation flux density film for one part of the magnetic pole.
Figure 14B:
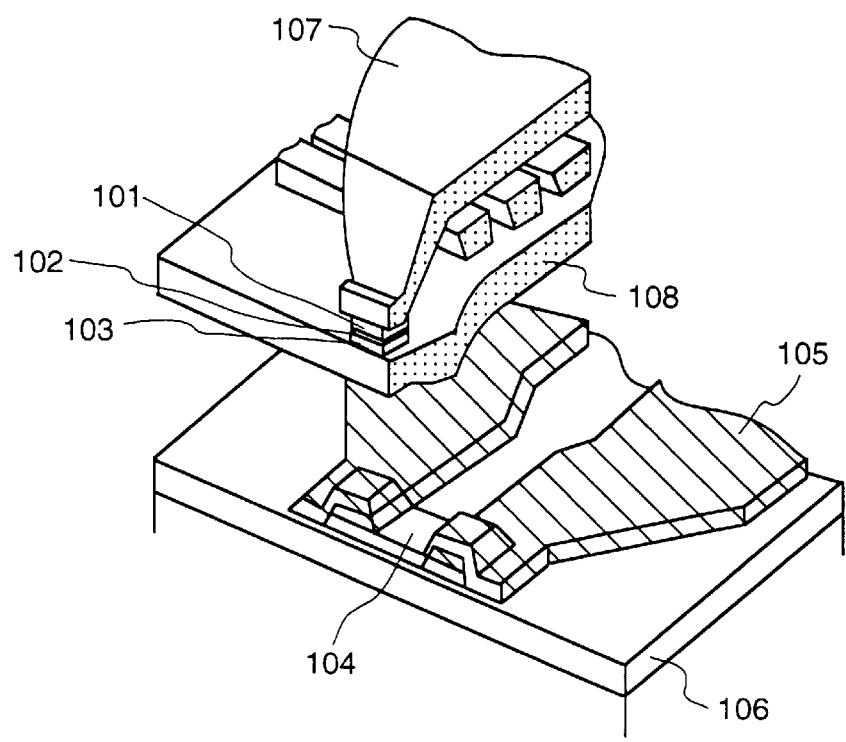

FIG. 14A and 14B show an example of a recording reproducing head in which the high resistivity membrane, as described in the embodiment 1, is used as a recording head, and the recording head is combined with a reproducing head.

A huge magnetoresistance effect membrane 104 is used for the reproducing head, an electrode 105 to cause an electric current to flow contacts the huge magnetoresistance effect membrane 104 electrically. There is provided a lower shielding membrane 106 through the lower gap membrane under electrode 105 and the huge magnetoresistance effect membrane 104.

A high resistivity lower magnetic film 108 is disposed as the upper shielding membrane through the upper gap membrane on the huge magnetoresistance effect membrane 104, and the high resistivity lower magnetic film 108 consists of one part of the lower magnetic pole of the recording head. By constituting one part of this high resistivity lower magnetic film 108 as a high resistivity membrane, the radio frequency characteristic of the recording head may be improved.

The width of the gap membrane 102 of recording head is equal to that of the magnetic films disposed above and below, and the high saturation flux density membranes 101, 103 on respective sides of the gap membrane 102 are desirably constructed of a material having a higher saturation flux density than that of the other magnetic pole parts. A high resistivity upper part magnetic film 107 having a larger width is used on this high saturation flux density membrane 101. An electric current flows in the coil 109 of the recording head, and a signal is recorded in the recording media 110 by a magnetic field generated from the recording head. In addition, a head having a different configuration which was a hard magnetism tunnel membrane may be used for the reproducing head.

Figures 15, 16:
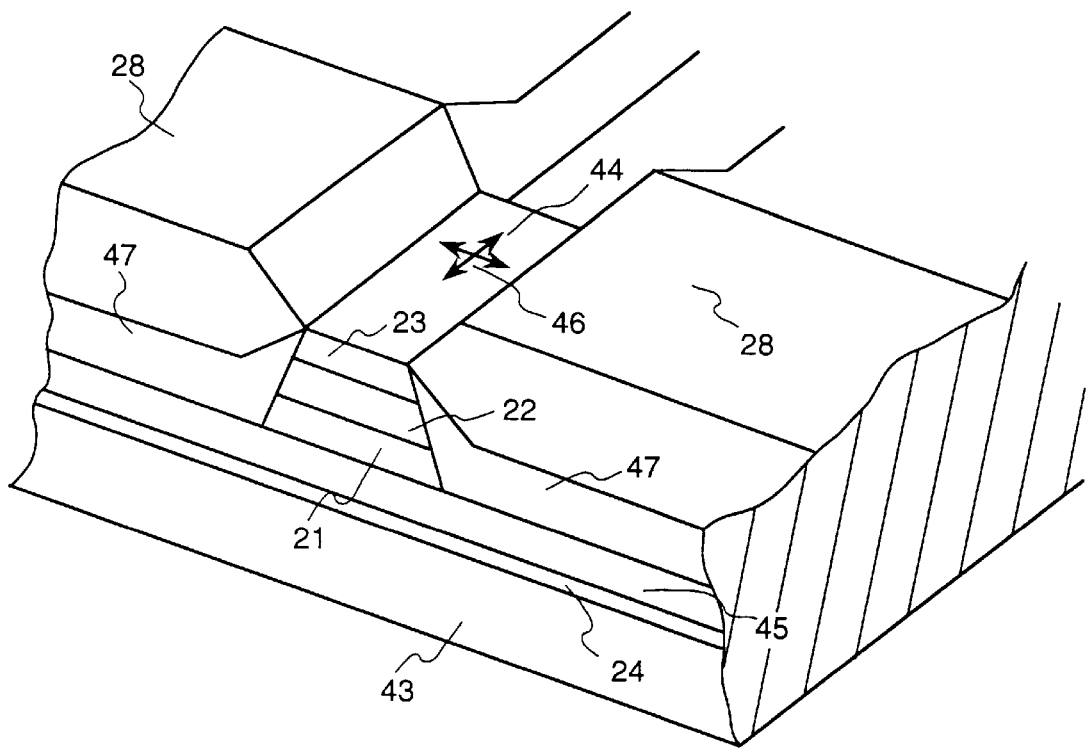
FIG. 15 is a perspective view of a magnetoresistance effect sensitive portion of a spin valve type magnetic head relating to the present invention.
FIG. 16 is a chart of elements of the spin valve film which uses a chrome—manganese alloying film/NiFe according to the present invention.

FIG. 15 is a partial sectional view of the magnetic head (MR sensor) using a spin valve magnetoresistance effect membrane according to the present invention. The MR sensor of the present invention has a configuration which places between the second magnetic layer 22 and the first magnetic layer 45 of soft ferromagnetic material, a non-magnetic metal layer 21, and this arrangement is supported on an appropriate substrate 43, such as a glass or ceramic substrate.

In the hard magnetic layers 45 and 22, the individual magnetization directions thereof are arranged to cross at about a 90 degree angle differential when the magnetic field is not applied. The magnetization direction of the second magnetic layer 22 is fixed to the same direction as the magnetic field direction of the magnetic media. The magnetization direction of the first magnetic layer 45 of soft ferromagnetic material, when the magnetic field is not applied, is inclined at 90 degrees to the magnetic field direction of the second magnetic layer. A magnetization rotation occurs with the first magnetic layer 45 responding to the applied magnetic field.

Figure 17:
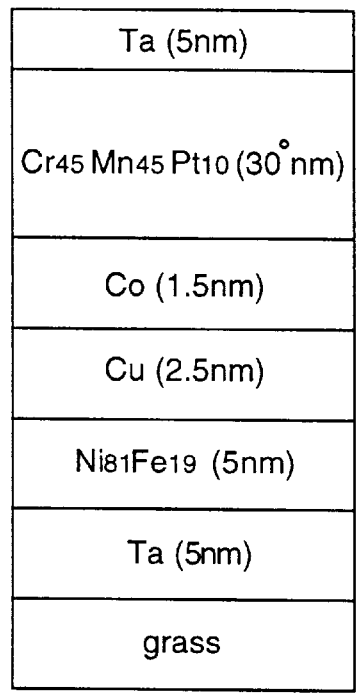
FIG. 17 is a chart of elements of the spin valve film which uses a chrome—manganese alloying film/Co according to the present invention.
Figure 18:
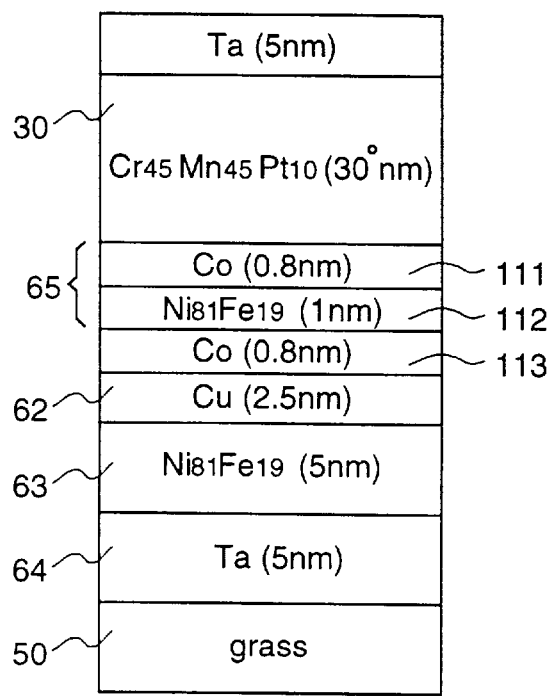
FIG. 18 is a chart of elements of spin valve magnetoresistance effect film used in the present invention.

The first magnetic layer 45, the non-magnetic metal layer 21, the second magnetic layer 22 and the antiferromagnetic substance layer 23, as described in the embodiment of the present invention, may be provided as a membrane with a laminated configuration, as shown in FIG. 16, FIG. 17 and FIG. 18, and, moreover, as the hard magnetism layer 47, $Co_{82} Cr_9 Pt_0$, $Co_{80} Cr_8 Pt_9(ZrO_2)_3$ may be used.

FIG. 16, FIG. 17 and FIG. 18 show the first magnetic layer 45 of this embodiment and a membrane constitution equivalent to the second magnetic layer 22 and those magnetic field directions are formed in the same manner as said article. Before adhering the first magnetic layer 45 of soft ferromagnetic material in this embodiment, an appropriate lower membrane 24, for example, made of Ta, Ru or CrV, is stuck on the substrate 43. An objective in securing the lower membrane 24 is in optimizing the formation, grain size number and the form of the layer stuck later. The form of the layer is very important to obtain a suitable MR effect. Furthermore, it is because a very thin spacing layer of the non-magnetic metal layer 21 may be utilized by the formation of the layer.

In order to make the effect of a branch minimum furthermore, a high electric resistance is preferable for the lower part layer. The lower part layer may be used as a reverse configuration, as mentioned above. Substrate 43 is made of a material having a sufficient high electric resistance and a plane surface, and in case of an appropriate crystal structure, the lower part membrane 24 is unnecessary.

As the first magnetic layer 45, means for producing a bias in a longitudinal direction is used in order to maintain a single domain condition in a direction to be parallel to this page. As a means for producing a bias in the longitudinal direction, a rigid hard magnetic layer 47 having characteristics of a high saturation coercive force, a high right angle degree, and a high electric resistance is used as well. The rigid hard magnetic layer 47 contacts a domain of an end of the first magnetic layer 45 made of the soft ferromagnetic material. The magnetization direction of the rigid hard magnetic layer 47 is parallel to this page.

The first antiferromagnetism layer contacts the domain of the end of the magnetic layer 45 so as to be stuck thereto, and a necessary bias in a longitudinal direction occurs. The antiferromagnetism layer preferably has a block temperature which is sufficiently different from that of an antiferromagnetism layer 23, which is used in order to fix the magnetization direction of the second magnetic layer 22 made of the ferromagnetic body.

Next, a capping layer made of a high resistance material, such as Ta, for example, is desirably stuck on all of the upper part of the MR sensor. An electrode 28 is provided, and a circuit is formed between the MR sensor structure, the current source and the detection means.

FIG. 16 to FIG. 18 respectively show a membrane constituting a magnetoresistance effect element according to the present invention, which is formed instead of membranes representing the non-magnetic metal layer 21, the second magnetic layer 22 and the antiferromagnetic substance layer 23, as shown in FIG. 15, and this membrane is formed by a radio frequency magnetron sputtering apparatus as follows.

In an atmosphere of Ar 3 mm Torr, the following materials are successively laminated on a ceramics substrate to a thickness of 1 mm and a diameter of 3 inches.

As a sputtering target, tantalum, a nickel −20 at % ferrum alloy, copper, cobalt, and chrome −50 at % manganese are used. In order to manufacture a chrome—manganese alloy membrane, a chip of 1 cm×1 cm of an additional element is arranged on a chrome—manganese target top, and the number of chips is increased or decreased so as to adjust the composition thereof. Moreover, when a Co—Fe—Ni layer is made as the hard magnetic membrane, the chip of 1 cm×1 cm of nickel, ferrum is arranged on the cobalt target top to adjust the composition.

Each layer of the laminating film is formed successively by generating a plasma in the apparatus by applying a radio frequency electric power to the cathode arranging each target, and opening and shutting a shutter arranged at every cathode.

In the film formation, applying a magnetic field of about 30 Oe in parallel to the substrate by using a permanent magnet, a one axis anisotropism is provided, and the direction of the replacement coupling magnetic field of the chrome-manganese film is guided to the direction of the applied magnetic field. An example of the formation condition stated above is shown by a table 1 as follows.

TABLE 1

| Layer | Ar gas pressure | rf output | Forming speed |
| --- | --- | --- | --- |
| Ta: | 0.8 m Torr | 300 W | 0.25 nm/s |
| NiFe: | 3 m Torr | 350 W | 0.17 nm/s |
| Cu: | 3 m Torr | 150 W | 0.2 nm/s |
| CrMnPt: | 8 m Torr | 350 W | 0.5 nm/s |
| Co: | 3 m Torr | 250 W | 0.13 nm/s |

A laminating film is heat-treated in vacuum thermal treatment equipment after being formed. The heat treatment is performed by raising the temperature of the film up from the room temperature to a predetermined temperature, for example 250° C., and after holding the temperature for a predetermined time, for example one hour, cooling the film to room temperature. In the total process of raising the temperature, holding the temperature and cooling, a magnetic field from 2 to 5 k Oe is applied in parallel to the surface of the substrate. The direction of the magnetic field is parallel to the magnetic field applied by the permanent magnet when forming the film. The formation of the element on the substrate is performed by a photo resist production process. After that, the substrate is secured to a slider, and is loaded in the magnetic recording apparatus.

FIG. 16 compares characteristics before the heat treatment and after the heat treatment of the spin valve film which has a magnetic laminating body using the antiferromagnetism film of 45 at % chrome −45 at % manganese −10 at % platina/81 at % Ni—19 at % Fe film.

The coupling magnetic field with one direction anisotropism will appear as a shift quantity of a right side loop of the figure. The coupling magnetic field before heat treatment is 300 Oe, 250° C., and 380Oe after the heat treatment of three hours. Considering the thickness of Ni Fe layer and the size of the magnetization, it is same size as the dimension shown in the prior art.

FIG. 17 is a figure comparing characteristics before the heat treatment and after the heat treatment of the spin valve film which has a magnetic laminating body using the antiferromagnetism film of 45 at % chrome −45 at % manganese −10 at % platina/ Co film. The coupling magnetic field before the heat treatment is almost similar to that in the case shown in FIG. 1 with 300 Oe. After the heat treatment for three hours at 250° C., the coupling magnetic field becomes 600 Oe, about two times greater than before. Considering the thickness of the Co layer and the size of the magnetization, a size of about two times of the coupling magnetic field produced by FIG. 1C is obtained.

FIG. 18 is another example of the present invention using a magnetic laminated body as the spin valve magnetoresistance effect film. The antiferromagnetism film 30 (45 at % Cr—45 at % Mn—10 at % Pt) and the hard magnetic layer 65 sticking thereto respectively consist of a Co layer 111 directly connected to the antiferromagnetism film 30, the soft magnetic layer 112 having a good magnetism characteristic (81 at % Ni—19 at % Fe), and a Co layer 113 directly contacting the non-magnetic layer 62 (Cu) and producing a huge magnetoresistance effect.

A foundation film 64 provides the foundation layer for controlling the orientation and the crystal grain size of the other film, and the soft magnetic layer 63 (81 at % Ni—19 at % Fe) is a free layer. The Co layer is arranged at a joint portion with the antiferromagnetism film and a joint portion with the non-magnetic film, however the magnetism characteristic of the hard magnetic layer 65 serving as the fixed layer is not deteriorated, and thickness and characteristic of the hard magnetic layer 65 may be held without increasing the magnetization quantity of the total layer.

Accordingly, the soft magnetic layer 112 desirably has a good magnetism characteristic and a smaller saturation flux density than the layers 113 and 111 consisting of Co, for example, Ni 81 Fe 19 film of the saturation flux density of 1 Tesla. Furthermore, the saturation flux density may be as low as 0.5 Tesla or so, and for example, a NiFe—Cr film is suitable, too, which NiFe—Cr film consists of a NiFe alloy containing 0 to 20 at % Cr, 75–95 at % Ni and the remainder Fe.

(Embodiment 3)

Figure 19:
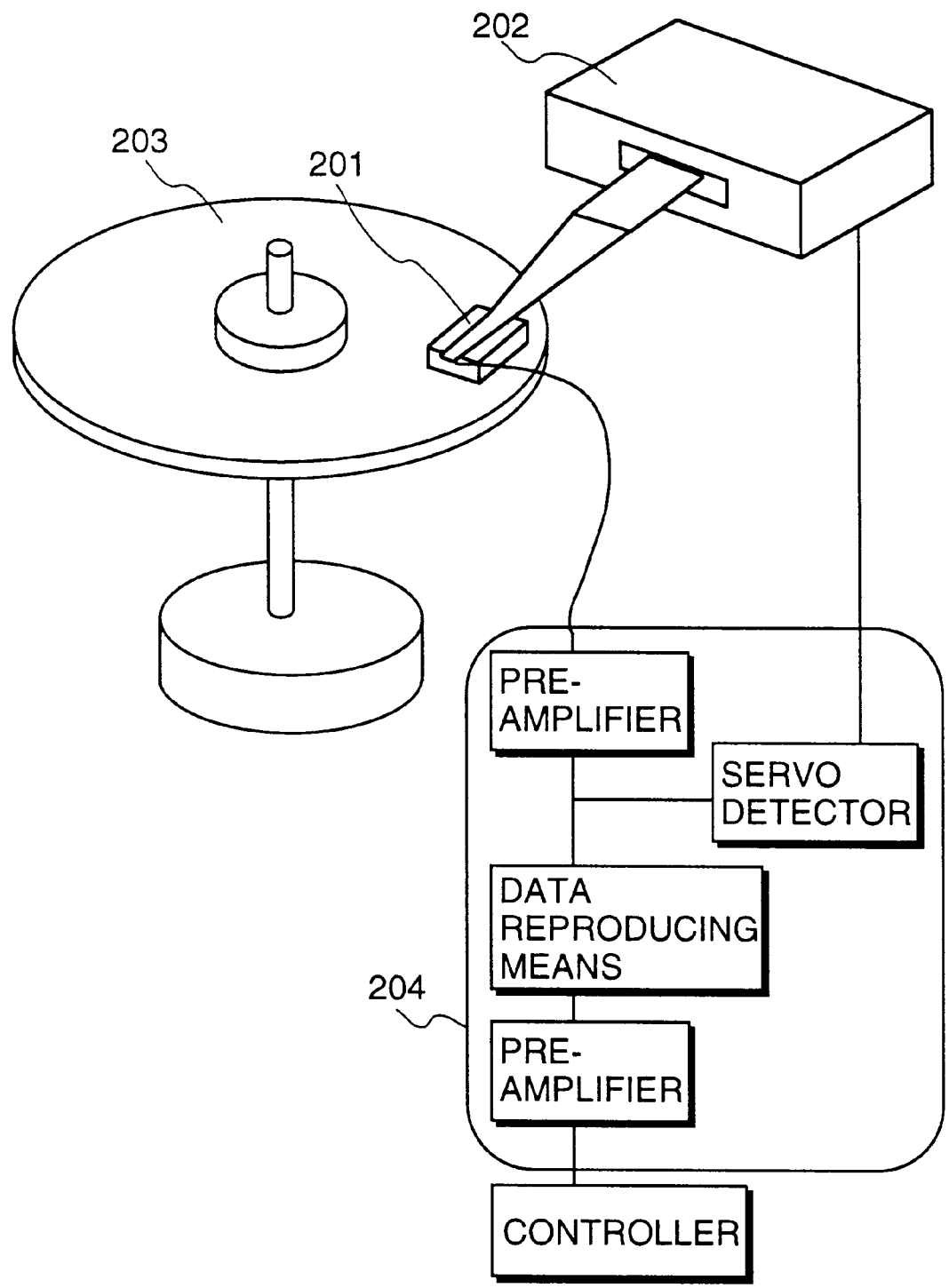
FIG. 19 is a diagram of a magnetic disc unit using a recording reproducing head according to the present invention.

FIG. 19 illustrates the overall configuration of the magnetic disc unit using the recording reproducing sectional pattern head of the embodiment 2. The recording reproducing separating type magnetic head 201 is controlled to a location on a recording media 203 by head positioning frame 202, the recording media 203 being provided as a magnetic disk turned by a motor, and the recording reproducing separating type magnetic head 201 is connected with a regenerative signal processor 204.

This apparatus consists of a DC motor for turning t;he magnetic disk, a magnetic head to write in and read information, a positioning apparatus to support the magnetic head and to change the location thereof relative to the magnetic disk, which may consist of an actuator and voice coil motor, and an air filter to keep the apparatus clean inside. The actuator consists of a carriage, a rail, and a bearing, and the voice coil motor consists of a voice coil and a permanent magneto.

In FIG. 19, eight magnetic disks are installed on the same rotation axis, thereby providing has a big storage capacity. The magnetic disk is constructed with a good surface having a surface roughness R MAX of 100 Å or less, preferably of 50 Å or less. The magnetic disk has a magnetic recording layer formed by a vacuum film formation method on the surface of the hard substrate. The magnetic thin film is used for the magnetic recording layer.

Because the film thickness of the magnetic recording layer formed by the vacuum film formation method is 0.5 $\mu$m or less, the surface condition of the hard substrate is just reflected as that of the recording layer. Accordingly, one having the surface roughness R MAX of 100 Å or less is used for the hard substrate. As such a hard substrate, glass, chemical strengthened soda-alumina glass or ceramic are used as a main component thereof.

Moreover, in case of the magnetic layer made of a metal or alloy, it is preferable to provide an oxide layer or nitride layer on the surface, or to provide the surface with an oxide film. Moreover, use of a carbon protective coat is desirable, too. By forming the head in this way, the durability of the magnetic recording layer is improved, and damage of the magnetic disk may be prevented in a case where recording and reproducing are effected with an extremely low floating quantity, or at the time of contact, start, and stop.

As a result of having measured the performance of the recording head according to the present invention (overwrite characteristic), as stated above, it has been confirmed that, even in a radio frequency domain of 40 MHz or more, a superior recording performance of about −50 dB is provided.

According to this embodiment, for a high coercive force media, information can be recorded fully even in the radio frequency domain, and a MR sensor of high sensitivity is provided, having an excellent MR effect based on the anisotropism magnetoresistance effect, such as a media transfer rate of 15 MB/second or greater, a recording frequency of 45 MHz or more, a high-speed transmitting of the data at more than the magnetic disk speed of 4000 rpm, an abbreviation of the access time, and an increase of the recording capacity, thereby, a magnetic disc unit with 3 Gb/in$^2$ or greater is provided as a surface recording density.

According to the present invention as stated above, at least one part of the magnetic pole of the recording head is made of a high resistivity film, and since the recording performance will hardly fall in the radio frequency range, a magnetic storage apparatus of high recording density is provided.

Furthermore, according to the present invention, a magnetic laminating body which had a sufficient coupling magnetic field and a high temperature stability may be provided, thereby, a reproducing head which has a sufficient reproducing capacity and low noise characteristic and a high density magnetic storage apparatus of high reliability may be provided.

What is claimed is:

1. A thin film magnetic head having an upper magnetic film and a lower magnetic film arranged on respective opposite sides of a non-magnetic gap membrane, said thin film magnetic head being characterized in that:
    at least an end part of said upper magnetic film or said lower magnetic film is constructed with at least a first layer of magnetic membrane adjacent to said non-magnetic gap membrane and a second layer of magnetic membrane disposed to be farther than said first layer from said non-magnetic gap membrane, a width of said second layer being wider than a width of said first layer so as to form a convex shape, and
    a resistivity of said second layer being higher than a resistivity of said first layer.

2. A thin film magnetic head as defined in claim 1, wherein
    a saturation flux density of said second layer is smaller than a saturation flux density of said first layer.

3. A thin film magnetic head having an upper magnetic film and a lower magnetic arranged on respective opposite sides of a non-magnetic gap membrane, said thin film magnetic head being characterized in that:
    at least one of end parts of said upper magnetic film and lower magnetic film is constructed with at least a first layer of magnetic membrane adjacent to said non-magnetic gap membrane and a second layer of magnetic membrane disposed to be farther than said first layer from said non-magnetic gap membrane, a width of said second layer being wider than a width of said first layer so as to form a convex shape, and a resistivity of said second layer being more than 50 $\mu\Omega$cm and being higher than a resistivity of said first layer.

4. A recording reproducing separate type magnetic head having a recording head for writing in information, a reproducing head for reading out information, and a magnetic shield provided therebetween, said recording reproducing separate type magnetic head being characterized in that:
    said recording head has an upper magnetic film and a lower magnetic film arranged on respective opposite sides of a non-magnetic gap membrane,
    at least an end part of said upper magnetic film or said lower magnetic film is constructed with at least a first layer of magnetic membrane adjacent to said non-magnetic gap membrane and a second layer of magnetic membrane disposed to be farther than said first layer from said non-magnetic gap membrane, a width of said second layer being wider than a width of said first layer so as to form a convex shape, and
    a resistivity of said second layer being higher than a resistivity of said first layer.

5. A recording reproducing separate type magnetic head writing in information, a reproducing head for reading out information, and a magnetic shield provided therebetween, said recording reproducing separate type magnetic head being characterized in that:
    said recording head has an upper magnetic film and a lower magnetic film arranged on opposite sides of a non-magnetic gap membrane,
    at least one of end parts of said upper magnetic film and said lower magnetic film is constructed with at least a first layer of magnetic membrane adjacent to said non-magnetic membrane and a second layer of magnetic membrane disposed to be farther than said first layer form said non-magnetic gap membrane, a width of said second layer being wider than a width of said first layer so as to form a convex shape, and a resistivity of said second layer being more than 50 μΩcm and being higher than a resistivity of said first layer.

6. A recording reproducing separate type magnetic head having a recording head for writing in information, a reproducing head for reading out information, and a magnetic shield provided therebetween, said recording reproducing separate type magnetic head being characterized in that:

said recording head has an upper magnetic film and a lower magnetic film arranged on opposite sides of a non-magnetic gap membrane, at least an end part of said upper magnetic film or said lower magnetic film is constructed with at least a first layer of magnetic membrane adjacent to said non-magnetic gap membrane and a second layer of magnetic membrane disposed to be farther than said first layer from said non-magnetic gap membrane, a width of said second layer being wider than width of said first layer so as to form a convex shape, a resistivity of said second layer being higher than a resistivity of said first layer and having a resistivity of more than 50 μΩcm, and said reproducing head has a ferromagnetic body and an antiferromagnetic body, having a uni-directional anisotropism, connected to said ferromagnetic body, at least one part of said antiferromagnetic body is made of a Cr—Mn alloy, and at least one part connected to said antiferromagnetic substance of said ferromagnetic body is made of Co or Co alloy.

7. A magnetic storage apparatus in which a thin film magnetic disk turns with a speed of more than 4000 rpm in recording and reproducing, and the recording frequency is 45 MHz or more, said magnetic storage apparatus comprising:

rotation means for rotating said thin film magnetic disk, a recording reproducing separate type magnetic head having a recording head provided on a floating type slider for writing in information and a reproducing head for reading out information, and a transfer means for supporting and transferring said floating type slider for said film magnetic disk, wherein said recording head has an upper magnetic film and a lower magnetic film arranged on opposite sides of a non-magnetic gap membrane, at least an end part of said upper magnetic film or said lower magnetic film is constructed with at least a first layer of magnetic membrane adjacent to said non-magnetic gap membrane and second layer of magnetic membrane disposed to be farther than said first layer from said non-magnetic gap membrane, a width of said second layer being wider than a width of said first layer so as to form a convex shape, and a resistivity of said second layer being more than 50 μΩcm and being higher than resistivity of said first layer.

8. A magnetic storage apparatus in which a thin film magnetic disk turns with a speed more than 4000 rpm in recording and reproducing, and the recording frequency is 45 MHz or more, said magnetic storage apparatus comprising:

rotation means for rotating said thin film magnetic disk, a recording reproducing separate type magnetic head having a recording head provided on a floating type slider for writing in information and a reproducing head for reading out the information, and a transfer means for supporting and transferring said floating type slider for said film magnetic disk, wherein said recording head has an upper magnetic film and a lower magnetic film arranged on opposite sides of a non-magnetic gap membrane, at least an end part of said upper magnetic film or said lower magnetic film is constructed with at least a first layer of magnetic membrane adjacent to said non-magnetic gap membrane and a second layer of magnetic membrane disposed to be farther than said first layer from said non-magnetic gap membrane, a width of said second layer being wider than a width of said first layer so as to form a convex shape, a resistivity of said second layer being more than 50 μΩcm and being higher than a resistivity of said first layer, and said reproducing head has a ferromagnetic body and an antiferromagnetic body, having a uni-directional anisotropism, connected to said ferromagnetic body, at least one part of said antiferromagnetic body is made of a Cr—Mn alloy, and at least one part connected to said antiferromagnetic substance of said ferromagnetic body is made of Co or a Co alloy.

9. A thin film magnetic head comprising:

an upper magnetic film, a lower magnetic film, a non-magnetic gap membrane constructed between said upper magnetic film and said lower magnetic film, at least an end part of said upper magnetic film or said lower magnetic film being constructed with at least a first layer of magnetic membrane adjacent to said non-magnetic gap membrane and a second layer of magnetic membrane disposed to be farther than said first layer from said non-magnetic gap membrane, a width of said second layer being wider than the width of said first layer so as to form a convex shape, and a resistivity of said second layer being higher than that of said first layer.

10. A thin film magnetic head as defined in claim 9, wherein a saturation flux density of said second layer having higher resistivity is smaller than that of said first layer.

* * * * *